US009411636B1

(12) United States Patent
Ting et al.

(10) Patent No.: US 9,411,636 B1
(45) Date of Patent: Aug. 9, 2016

(54) MULTI-TASKING REAL-TIME KERNEL THREADS USED IN MULTI-THREADED NETWORK PROCESSING

(75) Inventors: Dennis P. Ting, Groton, MA (US); John A. Hassey, Durham, NC (US); Robert E. Frazier, Fuquay-Varina, NC (US); Ramanamurthy Jayanty, Cary, NC (US); Daphna Nathanson, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 619 days.

(21) Appl. No.: 13/177,968

(22) Filed: Jul. 7, 2011

(51) Int. Cl.
*G06F 9/46* (2006.01)
*G06F 9/48* (2006.01)

(52) U.S. Cl.
CPC .................... *G06F 9/4843* (2013.01)

(58) Field of Classification Search
None
See application file for complete search history.

(56) References Cited

U.S. PATENT DOCUMENTS

| | | | |
|---|---|---|---|
| 5,893,140 A | 4/1999 | Vahalia et al. | |
| 5,933,603 A | 8/1999 | Vahalia et al. | |
| 6,065,037 A | 5/2000 | Hitz et al. | |
| 6,813,522 B1 | 11/2004 | Schwarm et al. | |
| 7,028,218 B2 | 4/2006 | Schwarm et al. | |
| 7,162,666 B2 | 1/2007 | Bono | |
| 7,178,145 B2 | 2/2007 | Bono | |
| 7,451,447 B1 * | 11/2008 | Deshpande | 718/102 |
| 7,739,379 B1 | 6/2010 | Vahalia et al. | |
| 7,908,656 B1 | 3/2011 | Mu | |
| 8,180,973 B1 | 5/2012 | Armangau et al. | |
| 2002/0052914 A1 | 5/2002 | Zalewski et al. | |
| 2002/0116563 A1 | 8/2002 | Lever | |
| 2004/0088704 A1 * | 5/2004 | Owen et al. | 718/100 |
| 2005/0066330 A1 * | 3/2005 | Kanai et al. | 718/102 |
| 2005/0268303 A1 * | 12/2005 | Anderson et al. | 718/102 |
| 2006/0161922 A1 * | 7/2006 | Amano et al. | 718/103 |
| 2009/0172683 A1 * | 7/2009 | Lin | G06F 9/505 718/103 |

OTHER PUBLICATIONS

Pattern-Oriented Software Architecture, Patterns for Concurrent and Networked Objects, vol. 2, Douglas Schmidt, Michael Stal, Hans Rohnert and Frank Buschmann, pp. 1-3 and 154-181, Published: 2000.*
Sporadic Multiprocessor Linux Scheduler, Paulo Baltarejo Sousa, Published 2009.*
Dynamic Scheduling of Hard Real-Time Tasks and Real-Time Threads, Karsten Schwan and Hongyi Zhou, Published: 1992.*

(Continued)

*Primary Examiner* — Emerson Puente
*Assistant Examiner* — Paul Mills
(74) *Attorney, Agent, or Firm* — Krishnendu Gupta; Jason A. Reyes; Deepika Bhayana

(57) ABSTRACT

For multi-threaded network processing, a real-time task is scheduled in a network server by placing the task on a real-time task list, activating the task when an event occurs during operation of the network server, and executing the task when scanning the task list and finding that the task has been activated. For example, an application or kernel process sends to a real-time network thread manager a request to register a task specified by an address of a task service routine. The thread manager places the address in an entry on the task list and returns a cookie identifying the entry. Upon occurrence of the event, an interrupt routine sends to a task activation routine a request to activate the task specified by the cookie. At periodic intervals, if there are any activated tasks on the task list, then a real-time scheduler scans the task list.

16 Claims, 23 Drawing Sheets

(56) References Cited

OTHER PUBLICATIONS

Uresh Vahalia, Unix Internals: The New Frontiers, Chapter 9, pp. 261-290, 1996, Prentice Hall, Inc., Simon & Schuster, Upper Valley River, New Jersey 07458.

"Delivering on the Promise of Internet Streaming Media," v1.0, pp. 1-15, Oct. 2000, CacheFlow Inc., Sunnyvale, CA.

"Streaming Media Optimization with CacheFlow Internet Caching Appliances," pp. 1-15, Jun. 11, 2001, CacheFlow, Inc., Sunnyvale, CA.

P. Venkat Rangan and Harrick M. Vin, "Designing File Systems for Digital Video and Audio," pp. 81-94, 1991, Multimedia Laboratory, University of California, Dept. of Computer Science and Engineering, La Jolla, CA.

Huanxu Pan, Lek Heng Ngoh, and Aurel A, Lazar, "A Time-Scale Dependent Disk Scheduling Scheme for Multimedia-on-Demand Servers," pp. 572-579,1996, IEEE, New York, NY.

K. K. Ramakrishnan et al., "Operating System Support for a Video-On-Demand File Service," ACM/Springer Journal on Multimedia Systems, 24 pages, vol. 3, Mar. 1995, Association for Computing Machinery, New York, NY.

Lev Vaitzblit , "The Design and Implementation of a High-Bandwidth File Service for Continuous Media," Nov. 4, 1991, 94 pages, Master's Thesis, Massachusetts Institute of Technology, Cambridge, MA.

David P. Anderson, Yoshitomo Osawa and Ramesh Govindan, "A File System for Continuous Media," ACM Transactions on Computer Systems, vol. 10, No. 4, pp. 311-337, Nov. 1992, Association for Computing Machinery, Inc., New York, NY.

Celerra File Server in the E-Infostructure, 2000, 12 pages, EMC Corporation, Hopkinton, MA.

Bill Nowicki, Network Working Group, RFC 1094, "NFS: Network File System Protocol Specification," Mar. 1989, 27 pages, Sun Microsystems, Inc., Santa Clara, CA.

Paul J. Leach and Dilip C. Naik, "A Common Internet File System," Dec. 19, 1997, 121 pages, Microsoft Corporation, Redmond, WA.

J. Satran et al., RFC 3720, "Internet Small Computer System Interface (iSCSI)," Network Working Group, Apr. 2004, 257 pages, The Internet Society, Reston, VA.

The OSI (Open System Interconnection) Model, printed Nov. 11, 2009, 7 pages, infocellar.com.

Berkeley sockets, Wikipedia, Nov. 21, 2009, 14 pages, Wikimedia Foundation, Inc., San Francisco, CA.

M. Morioka et al., Design and Evaluation of the High Performance Multi-Processor Server, VLSI in Computers and Processors, Cambridge, Mass., Oct. 10-12, 1994, pp. 66-69, IEEE Computer Society Press, Los Alamitos, CA.

Building Cutting-Edge Server Applications, White Paper, 2002, 10 pages, Intel Corporation, Santa Clara, CA.

Intel Core i7 Processor Extreme Edition, Product Brief, downloaded Nov. 20, 2009, 2 pages, Intel Corporation, Santa Clara, CA.

Intel Core 2 Extreme Quad-Core Mobile Processor and Intel Core 2 Quad Mobile Processor on 45-nm Process, Datasheet, Jan. 2009, 72 pages, Intel Corporation, Santa Clara, CA.

Improving Network Performance in Multi-Core Systems, White Paper, 2007, 4 pages, Intel Corporation, Santa Clara, CA.

Intel Pentium 4 and Intel Xeon Processor Optimization, Reference Manual, 2002, 35 pages, Intel Corporation, Santa Clara, CA.

Threading Services, web page, downloaded Jul. 13, 2002, 2 pages, Intel.com, Intel Corporation, Santa Clara, CA.

Threading Tools, web page, downloaded Jul. 13, 2002, 6 pages, intel.com, Intel Corporation, Santa Clara, CA.

EMC Celerra Unified Storage, Mar. 2011, 6 pages, EMC Corporation, Hopkinton, MA.

Branstad, et al, The Role of Trust in Protected Mail, IEEE Computer Socitey Symposium on Research in Security and Privacy, May 7-9, 1990, Oakland, California, USA, pp. 210-215, IEEE, New York, NY.

* cited by examiner

MULTI-TASKING REAL-TIME KERNEL THREADS USED IN MULTI-THREADED NETWORK PROCESSING

FIELD OF THE INVENTION

The present invention relates generally to a network server having multiple core central processing units, and in particular to scheduling of execution of real-time tasks by the core central processing units.

BACKGROUND OF THE INVENTION

A network file server provides network clients, such as personal computers or workstations, with shared access to a file system in data storage. The network file server supports a network data transmission protocol, such as the Transmission Control Protocol (TCP) over the Internet Protocol (IP), for transmission of data packets between the network file server and the network clients. The network file server supports a file access protocol, such as the Network File System (NFS) protocol or the Common Internet File System (CIFS) protocol, for client access to a hierarchical file system of directories and regular data files in the data storage. The network file server maintains a file system cache memory of recently accessed files, and if data to be accessed is not found in the file system cache, then the network file server fetches the data from the data storage. The network file server uses a storage access protocol, such as the Small Computer System Interface (SCSI) or Fibre-Channel (FC) protocol, for accessing data in the data storage.

A network file server typically includes a general purpose commodity digital computer and a disk storage array. The commodity general purpose digital computer is often loaded up with random access memory for the file system cache, and has a good number of network adapters and disk adapters for enhanced throughput between the client network and the disk storage array. The commodity general purpose digital computer is especially programmed to exploit the conventional multi-tasking and multi-processing capabilities of the commodity general purpose digital computer. These conventional multi-tasking and multi-processing capabilities include the pipelining of input/output data though network interface adapters, disk adapters, and a direct memory access input/output unit, and the use of multiple "core" central processing units (CPUs) for processing of the data in a shared random access memory.

Before the commercial availability of multi-CPU commodity general purpose digital computers, network file servers employed a multi-tasking real-time operating system for exploiting the multi-tasking capabilities of the commodity general-purpose computers. For example, as described in Vahalia et al. U.S. Pat. No. 5,933,603, incorporated herein by reference, a real-time scheduler was used in a video file server for scheduling isochronous tasks and also general purpose tasks programmed as code threads. The real-time tasks not only ensured isochronous delivery of the real-time video but also were used for "polling" device drivers and communication stacks. As further described in Vahalia U.S. Pat. No. 5,893,140, incorporated herein by reference, this real-time scheduler was also used in a network file server. The method of polling for pending work, as opposed to interrupt-driven processing, was said to contribute to system stability and alleviate most of the problems that arise during overloads. It also was said to provide isolation between multiple real-time tasks that have differing performance requirements.

The use of a multi-CPU general purpose commodity digital computer in a network file server introduced a problem of distributing the execution of real-time and general-purpose code threads among the multiple "core" CPUs. It was discovered that some code threads should be permanently assigned to a specific CPU, and other code threads should be assigned initially or temporarily to a specific CPU when execution of the code thread begins. In other words, each code thread should have either a "hard" or a "soft" affinity for a CPU. For example, as described in Bono U.S. Pat. No. 7,178,145, incorporated herein by reference, each processor has a respective hard affinity queue and soft affinity queue. For execution of a thread, a queue loader places an instance of the thread upon the hard or soft affinity queue of a selected processor. The selection may use an affinity attribute, processor attribute, accessor function, or a respective program of code threads for each processor. A thread instance on a processor's hard affinity queue is executed only by that processor. A thread instance on a processor's soft affinity queue is executed by that processor unless another processor has a soft affinity queue empty of thread instances ready for execution. Each processor alternates service priority between its hard and soft affinity queues.

SUMMARY OF THE INVENTION

In accordance with one aspect, the invention provides a method including a data processor of a network server executing computer instructions stored on non-transitory computer readable storage medium to perform the steps of: (a) an application or kernel process of the network server invoking a real-time network thread manager to place a real-time task on a real-time task list; (b) activating the real-time task on the real-time task list when an event occurs during operation of the network server; and (c) a real-time scheduler of the network server scanning the real-time task list, and when scanning the real-time task list, the real-time scheduler finding that the real-time task on the real-time task list has been activated, and executing the task on the real-time task list in response to finding that the real-time task on the real-time task list has been activated.

In accordance with another aspect, the invention provides a network server. The network server includes a data processor, network adapters for linking the data processor to a data network for exchange of data packets between the data processor and clients in the data network, and non-transitory computer readable storage medium storing computer instructions. The computer instructions, when executed by the data processor, perform the steps of: (a) an application or kernel process of the network server invoking a real-time network thread manager of the network server to place a real-time task on a real-time task list; (b) activating the real-time task on the real-time task list when an event occurs during operation of the network server; and (c) a real-time scheduler of the network server scanning the real-time task list, and when scanning the real-time task list, the real-time scheduler finding that the real-time task on the real-time task list has been activated, and executing the task on the real-time task list in response to finding that the real-time task on the real-time task list has been activated.

BRIEF DESCRIPTION OF THE DRAWINGS

Additional features and advantages of the invention will be described below with reference to the drawings, in which.

Figure 1:
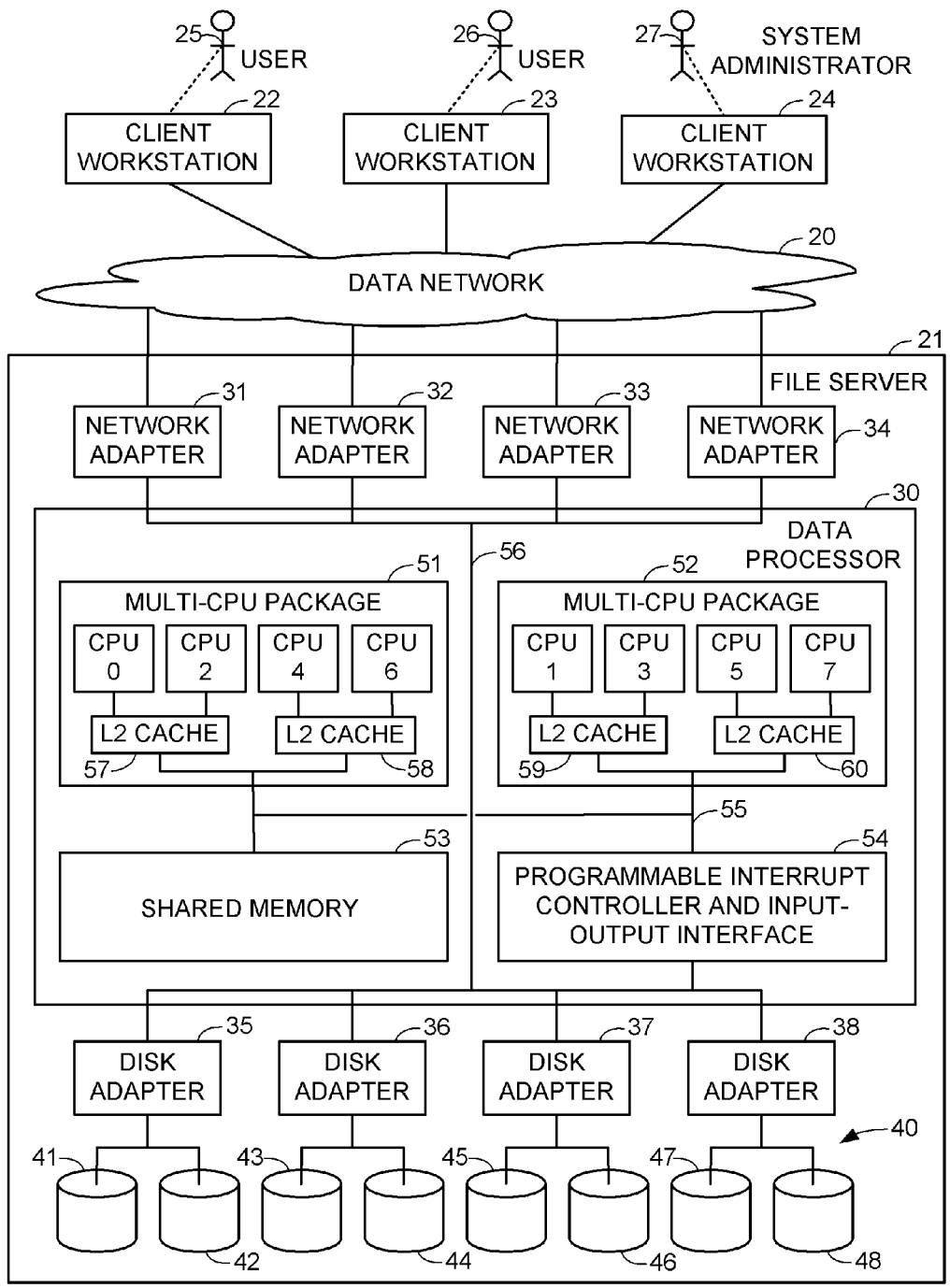
FIG. 1 is block diagram of a data processing system including a network file server having a multi-CPU commodity general purpose digital computer.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data processing network 20 including a network file server 21 and client workstations 22, 23, and 24 operated by human users 25, 26, and 27. The data network 20, for example, is an Ethernet or Internet Protocol (IP) data network. The user 27 is a system administrator responsible for configuration and maintenance of the data processing system.

The file server 21 includes a data processor 30, a disk storage array 40, network adapters 31, 32, 33, 34 for linking the data processor 30 to the data network 20, and disk adapters 35, 36, 37, and 38 for linking the data processor 30 to respective strings of disk drives 41, 42, 43, 44, 45, 46, 47, and 48 in the disk storage array 40.

The data processor 30 is a multi-CPU commodity general purpose digital computer including two multi-CPU packages 51, 52 sharing a random access memory 53 and a programmable interrupt controller and input-output interface 54. For example, the data processor 30 is typically purchased as a single printed circuit mother board or server blade including a certain minimal amount of random access memory and some network interfaces. Additional random access memory is added as appropriate for a network file server having a desired data storage capacity. Typically some additional network interface cards and disk adapter cards are also added to provide the desired number of network adapters 31-34 and disk adapters 35-38. For example, the network interface cards are Ethernet cards, and the disk adapter cards are SCSI or Fibre-Channel (FC) cards.

Presently the multi-CPU packages 51 and 52 on a typical file server blade each include four CPUs. In a conventional fashion, the four CPUs in the first multi-CPU package 51 are designated CPU 0, CPU 2, CPU 4, and CPU 6, and the four CPUs in the second multi-CPU package 52 are designated CPU 1, CPU 3, CPU 5, and CPU 7. It is well known that each CPU includes a respective micro-control unit, instruction decoder pipeline, arithmetic logic unit, data register set, and level-one (L1) cache memory for storing program instructions and data. Each multi-CPU package 51, 52 also includes two separate level-two (L2) cache memories, and each of the level-two (L2) cache memories is shared by a respective pair of CPUs in each package. Thus, CPU 0 and CPU 2 share a level-two (L2) cache memory 57, CPU 2 and CPU 4 share a level-two (L2) cache memory 58, CPU 1 and CPU 3 share a level-two (L2) cache memory 59, and CPU 5 and CPU 7 share a level-two (L2) cache memory 60.

Figure 2:
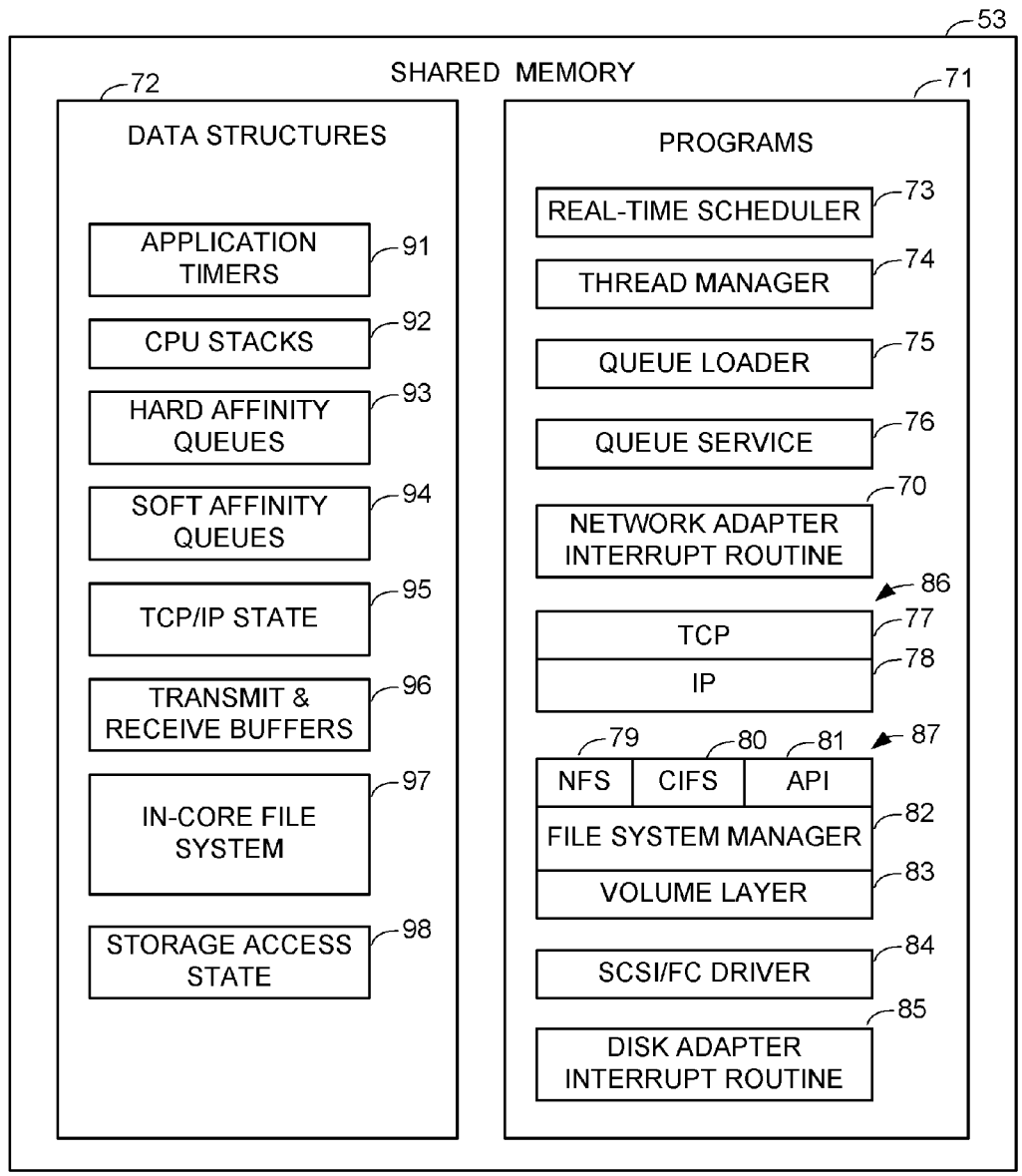
FIG. 2 is a block diagram of programs and data structures in shared memory in the network file server of FIG. 1.

FIG. 2 shows programs 71 and data structures 72 in the shared memory 53. The programs include a real-time scheduler 73, a thread manager 74, a queue loader 75, a queue service routine 76, a network adapter interrupt routine 70, a Transmission Control Protocol (TCP) module 77, an Internet Protocol (IP) module 78, a Network File System (NFS) module 79, a Common Internet File System (CIFS) module 80, an Application Program Interface (API) module 81, a file system manager 82, a volume layer 83, a SCSI/FC driver 84, and a disk adapter interrupt routine 85. The data structures 72 include application timers 91, CPU stacks 92, hard affinity queues 93, soft affinity queues 94, TCP/IP state 95, transmit and receive buffers 96, an in-core file system 97, and storage access state 98.

The shared memory 53 storing the programs 71, for example, is battery-backed solid-state random access memory, and the programs 71 are loaded into this random-access memory from disk storage at boot time. Alternatively, the shared memory 53 storing the programs 71 is electrically programmable and erasable memory (EEPROM). In general, the shared memory 53 storing the programs 71 is non-transitory computer readable storage medium. Non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks.

The real-time scheduler 73 maintains the application timers 91, and schedules execution and context switching between real-time (RT) and general purpose (GP) code threads, as will be further described with respect to FIGS. 3 and 4 and FIGS. 10 to 26. The thread manager 74 performs the execution and context switching by searching the queues 93, 94 and exchanging CPU context between the CPU stacks 92 and thread state information of code threads on the queues 93 and 94. The queue loader 75 and the queue service routine 76 more specifically perform the loading and servicing of the queues 73, 74. Further details of the thread manager 74, queue loader 85, and the queue service routine 86 are found in Bono U.S. Pat. No. 7,178,145, incorporated herein by reference.

The network adapter interrupt routine 70 is executed in response to an interrupt signal from a network adapter when the network adapter receives a data packet from the data network and is ready to send the data packet to the data processor. The network adapter interrupt routine 70 changes the TCP/IP state 95 to indicate that the data packet has been received by the particular network adapter.

The TCP module 77 and the IP module 78 together comprise what is commonly known as the "network stack" 86. The IP module 78 handles transmission and reception of IP data packets from the network adapters (31-34 in FIG. 1). The TCP module 77 maintains reliable connections between the network clients (22, 23, 24 in FIG. 1) and the file server (21 in FIG. 1) by requesting re-transmission of IP data packets when the packets are found to be missing from the sequence of the packets received for a particular connection. The transmit and receive buffers 96 include a respective transmit buffer and a respective receive buffer associated with each active TCP connection between a network client process and an application process of the network file server. The TCP module 77 maintains TCP/IP state 95 indicating the active TCP connections and the buffers and remote IP address associated with each active connection. The TCP module 77 includes a send function for sending data that is written to the transmit buffer and transmitted to the network client process, and a receive function for receiving data that is received from the network client process and read from the receive buffer.

The NFS module 79, CIFS module 80, API module 81, file system manager 82, and volume layer 83 together comprise what is commonly known as the "file system stack" 87. The file system stack 87 performs file system processing in response to a file access command. The NFS module 79 recognizes file access commands received from the client workstations (22, 23, and 24 in FIG. 1) in accordance with the NFS protocol. The CIFS module 80 recognizes file access commands received from the client workstations (22, 23, and 24 in FIG. 1) in accordance with the CIFS protocol. For example, network clients such as UNIX (Trademark) workstations may use the Network File System (NFS) protocol to access files in the disk storage array (40 in FIG. 1), and network clients such as Microsoft Windows (Trademark) workstations may use the Common Internet File System (CIFS) protocol to access files in the disk storage array (40 in FIG. 1).

The application program interface (API) module 81 recognizes additional file access commands which may extend the functionality of the NFS and CIFS protocols. For example, if the NFS module 79 or the CIFS module 80 receives a file access request including an operation code that is not in accordance with the NFS or CIFS protocol, then the NFS module 79 or the CIFS module 80 will invoke the API module 81 in an attempt to execute the operation or function. The API module 81 may also respond to remote procedure calls from network clients in accordance with other network protocols, such as the Simple Network Management Protocol (SNMP) or the Hypertext Transfer Protocol (HTTP).

The file system manager 82 manages hierarchical file systems in the disk storage array (40 in FIG. 1). The file system manager 82 also maintains an "in core" cache of the file system 97. A suitable kind of file system is the UNIX file system, as described in Chapter 9, pp. 261-289 of Uresh Vahalia, Unix Internals: The New Frontiers, 1996, Prentice Hall, Inc., Simon & Schuster, Upper Valley River, N.J. 07458. The file system manager 82 is further described in Vahalia et al. U.S. Pat. No. 5,893,140 issued Apr. 6, 1999, entitled "File Server Having a File System Cache and Protocol for Truly Safe Asynchronous Writes," incorporated herein by reference.

The volume layer 83 organizes the storage of the disk array (40 in FIG. 1) into logical volumes of data blocks. The Small Computer System Interface (SCSI) or Fibre-Channel (FC) driver 84 links the volume layer 83 to the disk storage array (40 in FIG. 1). The File System Manager 82 and the SCSI/FC driver 84 maintain the storage access state 98 of pending storage access requests for transfer of data between the in-core file system 97 and the disk storage array (40 in FIG. 1). The disk adapter interrupt routine 85 is executed in response to an interrupt signal from a disk adapter when the disk adapter has received a block of data from the disk array and is ready to send the block of data to the data processor. The disk adapter interrupt routine 85 changes the storage access state 98 to indicate that the block of data has been received by the particular disk adapter.

Figure 3:
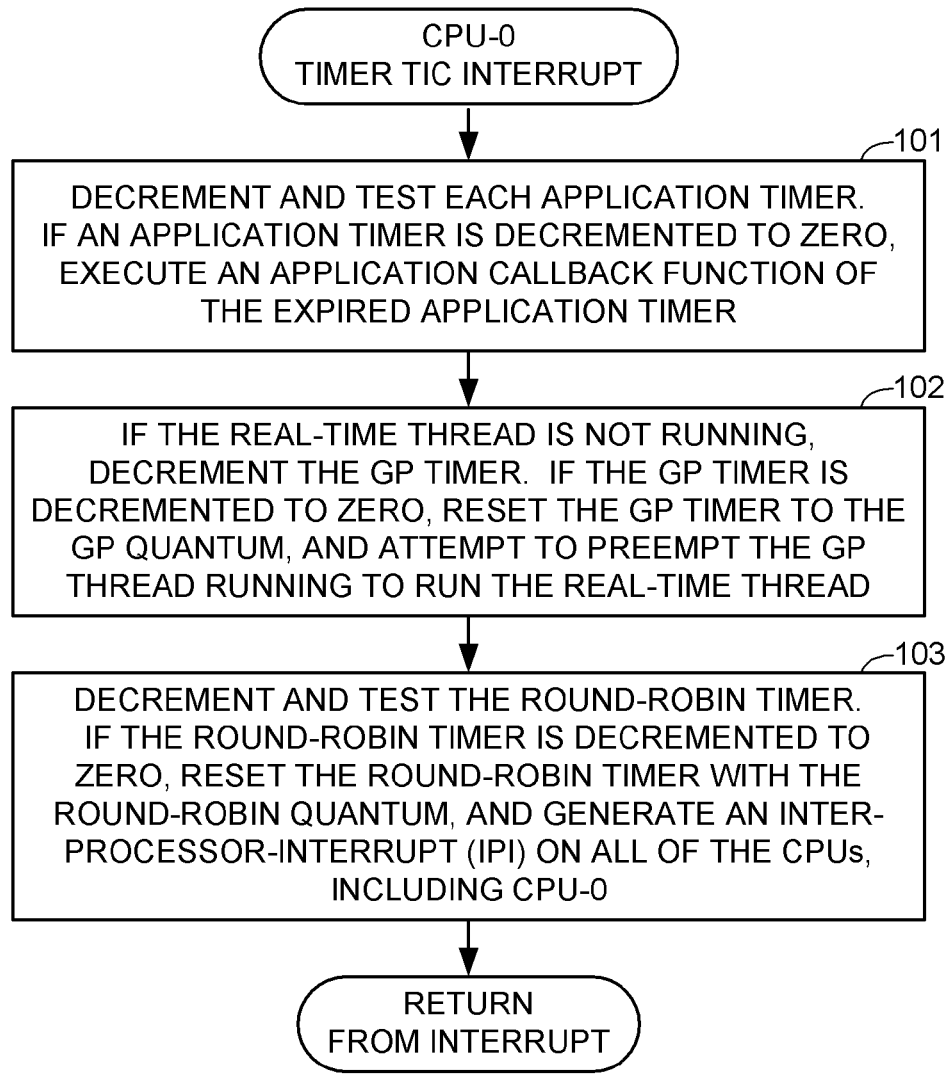
FIG. 3 is a flowchart of a conventional "timer tic" interrupt routine executed by one of the core CPUs in the network file server of FIG. 1.

FIG. 3 shows a "timer tic" interrupt routine executed by CPU 0 in the network file server of FIG. 1. CPU 0 is dedicated to servicing application timers and general purpose threads that require a certain guaranteed minimum amount of processing time, referred to as the GP quantum. CPU 0 also periodically interrupts all of the other CPUs at a certain period referred to as the round-robin quantum. In a first step 101, in response to a periodic "timer tic" interrupt signal, CPU 0 decrements and tests each of the application timers (91 in FIG. 2). If an application timer is decremented to zero, then CPU 0 executes an application callback function of the expired application timer.

In step 102, if a real-time thread of CPU 0 is not running, then CPU 0 decrements a GP timer. If the GP timer is decremented to zero, then the GP timer is reset to the GP quantum, and an attempt is made to preempt the GP thread that is running to run the real-time thread of CPU 0. For example, the attempt is successful if a GP preemption enable state is set for CPU 0.

In step 103, CPU 0 decrements and tests a round-robin timer. If the round-robin timer is decremented to zero, then CPU 0 resets the round-robin timer with the round-robin quantum, and generates an inter-processor interrupt (IPI) on all of the core CPUs, including CPU 0. After step 103, execution of CPU 0 returns from the timer-tic interrupt.

Figure 4:
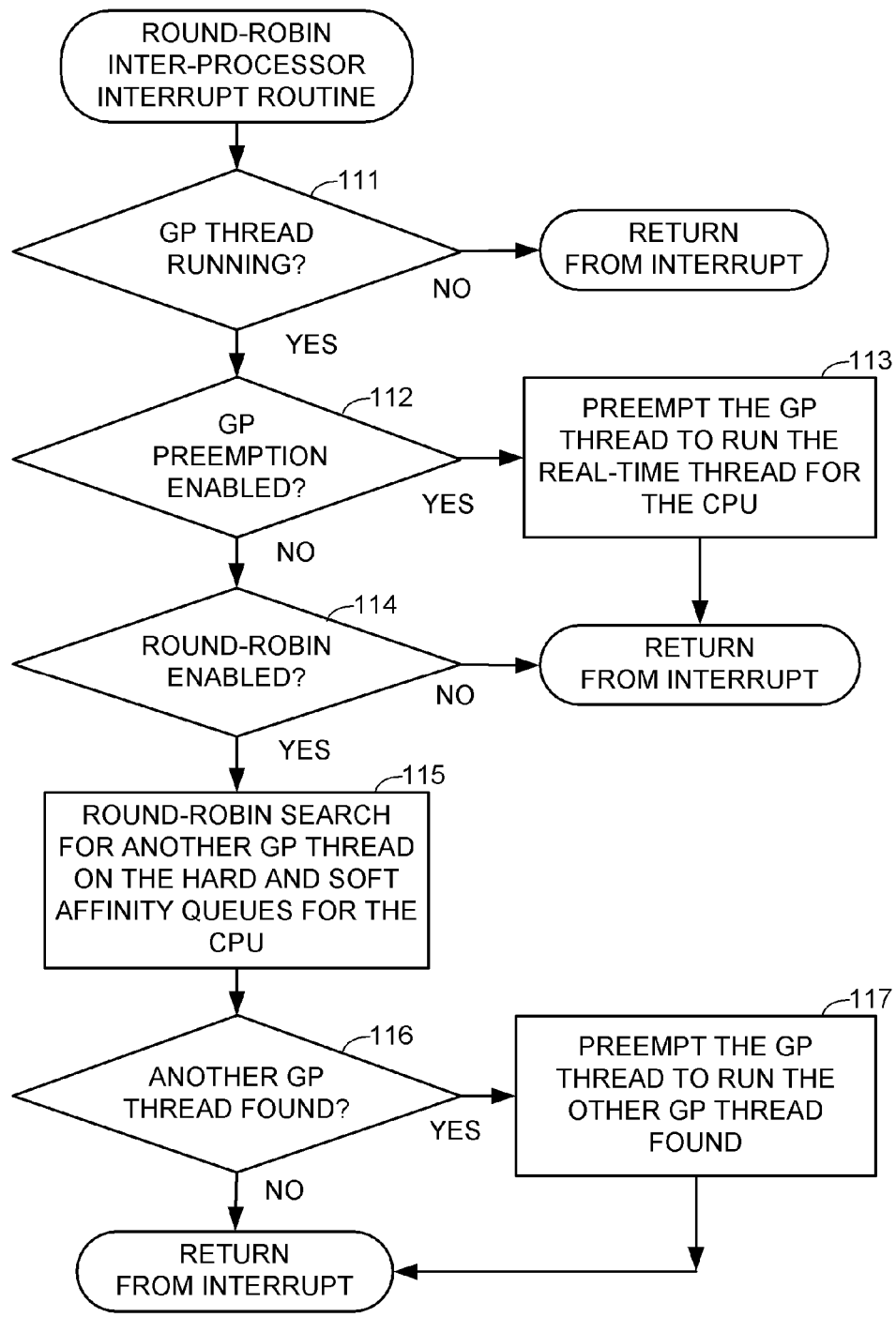
FIG. 4 is a flowchart of a conventional round-robin inter-processor interrupt routine executed by core CPUs in the network file server of FIG. 1.

FIG. 4 shows a conventional round-robin inter-processor interrupt routine. In a first step 111, if a GP thread is not running on the CPU, then execution of the CPU returns from the interrupt. Otherwise, execution continues from step 111 to 112. In step 112, if GP preemption is enabled, then execution branches from step 112 to step 113. In step 113, the GP thread is preempted to run the real-time thread for the CPU. Preemption of the GP thread to run the real-time thread involves placing previously-saved CPU register context of the real-time thread on the CPU stack so that when execution returns from the interrupt after step 113, execution resumes with the execution of the real-time thread instead of the GP thread that was interrupted by the round-robin inter-processor interrupt.

In step 112, if GP preemption is not enabled, then execution continues from step 112 to step 114. In step 114, if "round-robin" is not enabled for the CPU, then execution returns from the interrupt, so that execution of the GP thread resumes.

In step 114, if "round-robin" is enabled for the CPU, then execution continues from step 114 to step 115. In step 115, the CPU performs a round-robin search for another CP thread on the hard and soft affinity queues for the CPU. For example, the thread manager maintains a round-robin pointer to each of the hard and soft affinity queues. The round-robin search involves alternately advancing the round-robin pointers for the hard and soft affinity queues of the CPU until a next GP thread is found. If a round-robin pointer reaches the end of its respective queue, then it is reset to point to the beginning of its respective queue. In step 116, if another GP thread is not found by the round-robin search, then execution returns from the interrupt to resume execution of the GP thread that was interrupted by the round-robin inter-processor interrupt. Otherwise, if another GP thread was found, then execution branches from step 116 to step 117 to preempt the interrupted GP thread to run the other GP thread found. This involves swapping the context of the interrupted GP thread on the CPU stack with GP thread of the other GP thread previously saved by the thread manager. After step 117, execution returns from the inter-processor interrupt in order to resume execution of the other GP thread.

It should be understood that the real-time scheduler of FIGS. 3 and 4 provides a general framework for multi-tasking by switching the context of each CPU between execution of a thread manager, a real-time thread for the CPU, and general-purpose threads on the hard and soft affinity queues of the CPU. The real-time thread for the CPU is programmed in an appropriate fashion for effective use of this framework, depending on the particular real-time tasks to be performed.

Figure 5:
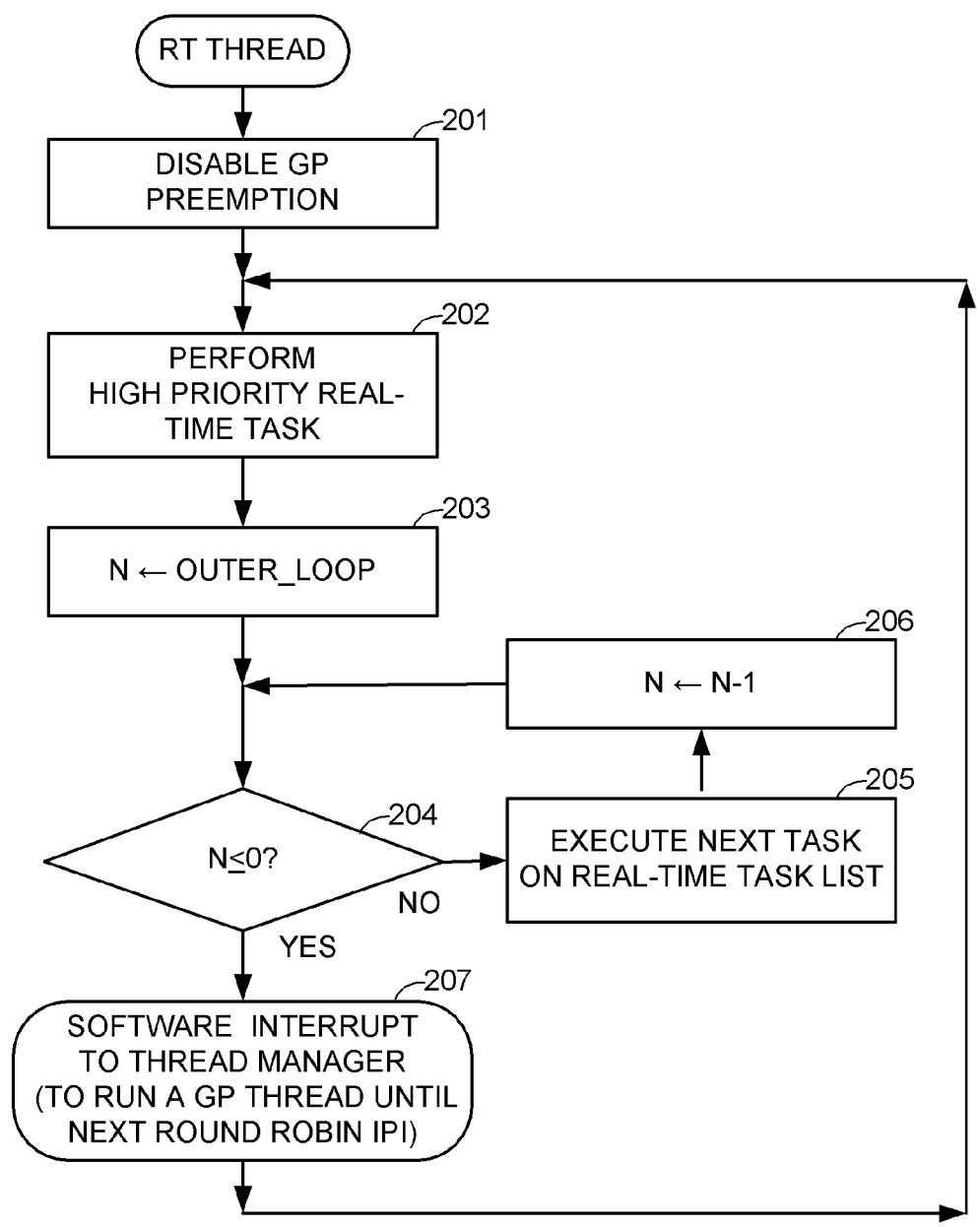
FIG. 5 is a flowchart of a conventional real-time thread for core CPUs in the network file server of FIG. 1.

For example, FIG. 5 shows a conventional way of programming the real-time thread for a core CPU in the file server of FIG. 1 in order to perform a high priority real-time task and a series of lower priority tasks on a real-time task list. In response to the round-robin IPI, the high-priority real-time task is performed, and then a certain number of the lower priority tasks are performed. The certain number is set by the value of an "OUTER_LOOP" parameter.

In a first step 201 of FIG. 5, GP preemption is disabled. In step 202, the high-priority real-time task is performed. In step 203, an inner loop counter "N" is set equal to the value of the "OUTER_LOOP" parameter. In step 204, if the counter "N" does not have a value less than or equal to zero, then execution branches to step 205 to execute a next task on the real-time task list. If the end of the list is reached, then the task at the beginning of the list is executed. In step 206, the counter "N" is decremented by one, and execution loops back to step 204. Once the counter "N" is decremented to zero, execution continues from step 204 to step 207.

In step 207, the real-time task performs a software interrupt to an entry point of the thread manager for switching context to a general-purpose thread. In this case, the thread scheduler responds to a software interrupt from the real-time thread by performing a round-robin search of the hard and soft affinity queues of the CPU (and a search of the soft affinity queues of the other CPUs, if no GP thread is found in the hard and soft affinity queue of the CPU). If no such GP thread is found, then the thread manager executes a "return from interrupt" instruction to return execution to the real-time thread. If such a GP thread is found, then the thread manger does a context switch from the real-time thread to the GP thread by removing and saving the CPU context of the real-time thread from the CPU stack and replacing it with saved context of the GP thread and then executing a "return from interrupt" instruction in order to return execution to the GP thread.

Figure 6:
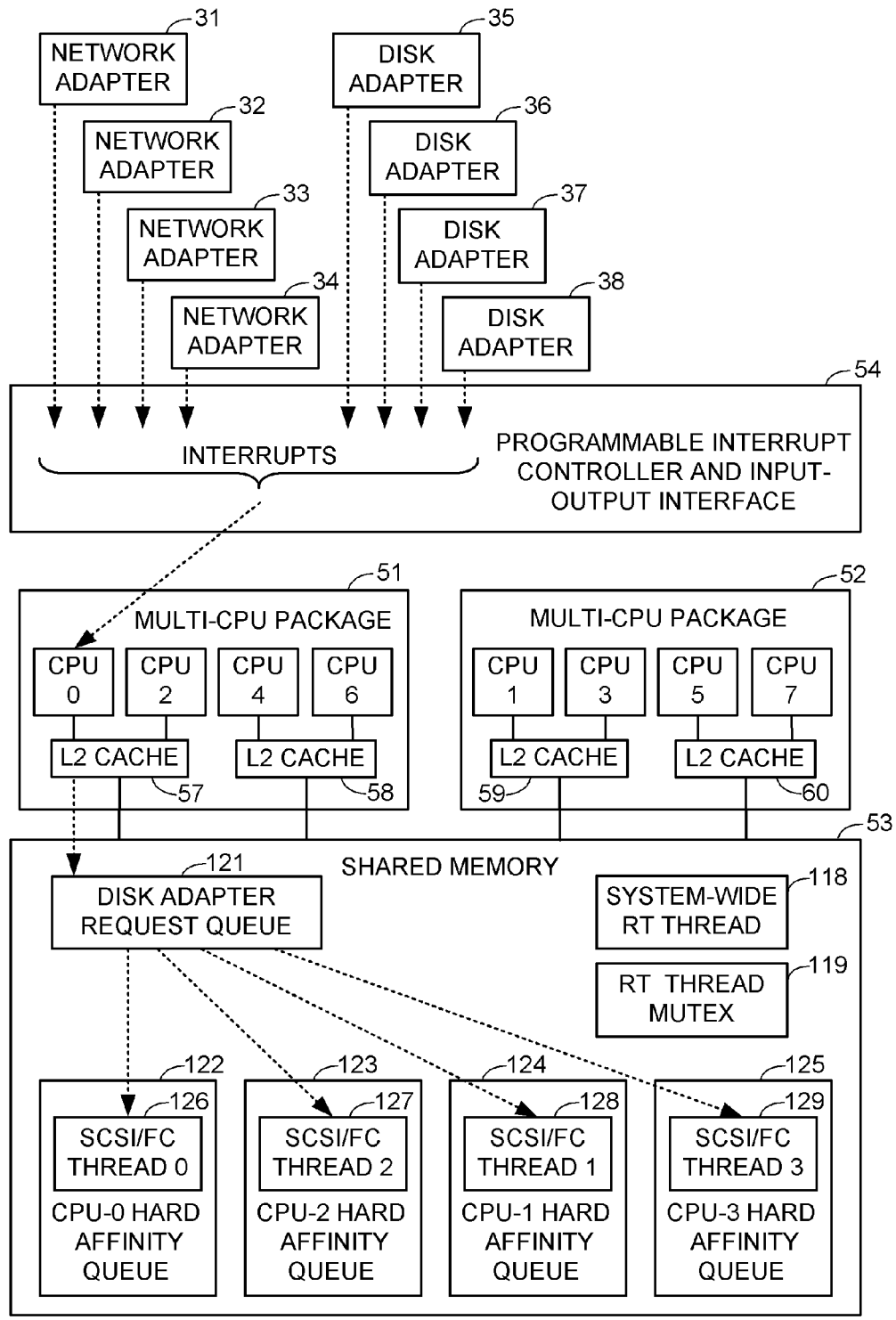
FIG. 6 is a block diagram showing a conventional assignment of interrupts and code threads to the core CPUs in the network file server of FIG. 1.

FIG. 6 shows how interrupts and code threads have been assigned to the core CPUs in the EMC Corporation CELERRA brand of network file server. The programmable interrupt controller 54 was programmed to map the interrupts of all of the network adapters 31, 32, 33, 34 and all of the disk adapters 35, 36, 37, 38 to CPU 0. CPU 0 executed a disk adapter interrupt routine to load disk adapter requests into a disk adapter request queue 121 in the shared memory 53. The disk adapter requests were serviced by hard affinity SCSI/FC threads 126, 127, 128, 129 in the respective hard affinity queues 122, 123, 124, 125 of CPU 0, CPU 2, CPU 1, and CPU 3. When executed, the SCSI/FC service thread would look for a service request on the disk adapter request queue, and if one was found on the queue, then the SCSI/FC service thread would service the request. In particular, if the queue was empty, the SCSI/FC service thread would return to the thread manager, else if the queue was locked, the SCSI/FC service thread would try again, else the SCSI/FC service thread would lock the queue, remove a service request, unlock the queue, and then service the service request. CPU 0 was also programmed to perform the "timer tic" interrupt of FIG. 2. Network stack processing of the TCP layer (77 in FIG. 2) and the IP layer (78 in FIG. 2) were performed by a system-wide real-time (RT) thread 118.

Most of the time, a particular one of the CPU's, as indicated by an RT thread mutex 119, was executing the system-wide RT thread 118. A high priority real-time task of each CPU was to check whether the RT thread mutex would indicate that none of the CPUs was currently executing the system-wide RT thread 118, and if not, then the CPU would take the mutex on the system-wide RT thread and execute the system-wide RT thread until the system-wide RT thread would call a routine to suspend execution of the system-wide RT thread.

Each network adapter interrupt resulted in a change in TCP/IP state. When executed, network stack processing of the system-wide real-time (RT) thread would detect and service the change in TCP/IP state. File system processing was performed by many NFS hard affinity threads assigned to the CPUs.

Figure 7:
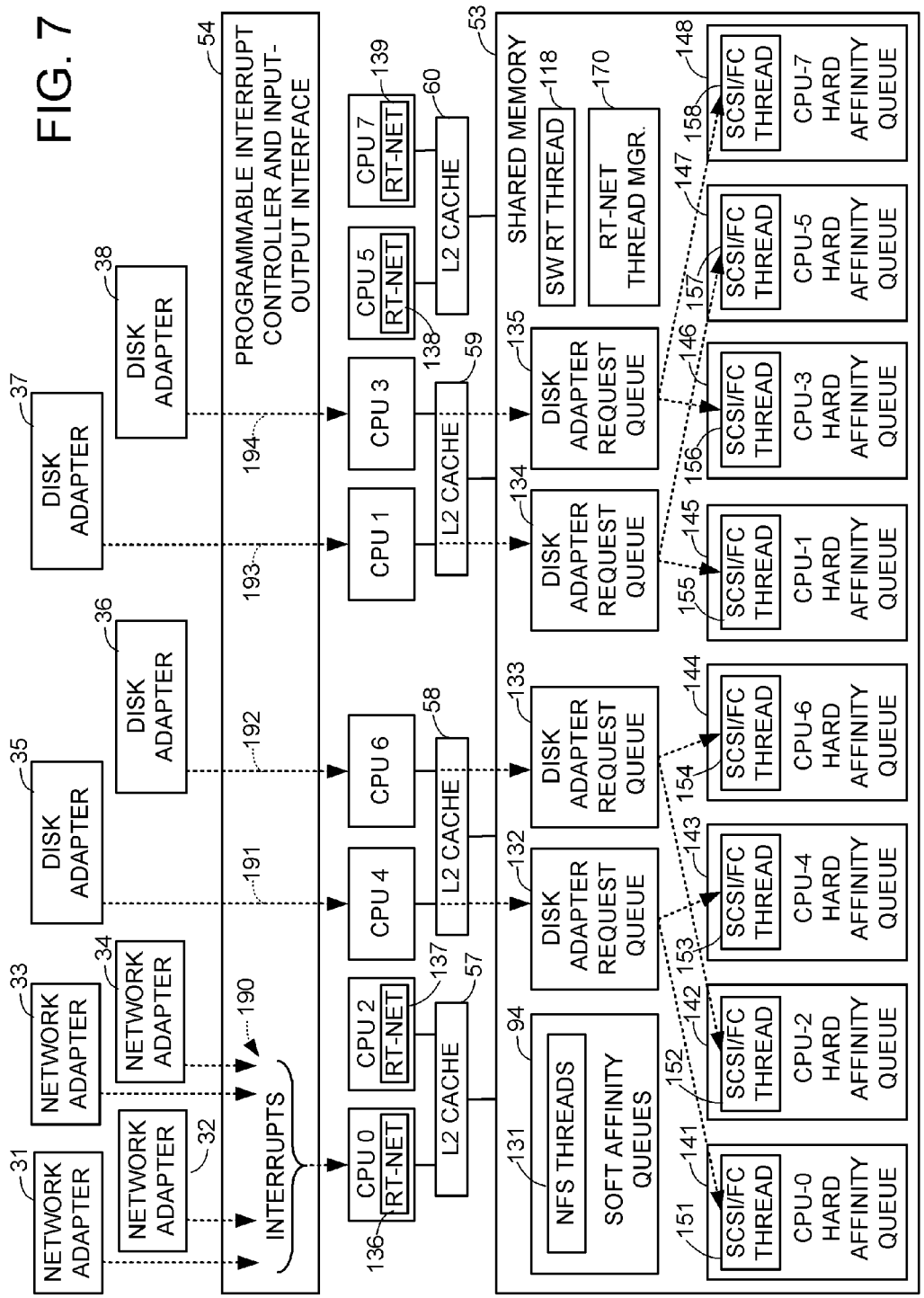
FIG. 7 is a block diagram showing an assignment of interrupts and code threads to the network file server core CPUs to perform parallel processing of real-time network processing tasks.

FIG. 7 shows an assignment of interrupts and code threads to the network file server core CPUs in order to provide multi-tasking of real-time kernel threads for network processing among a plurality of the core CPUs. The particular assignment of interrupts and code threads to the core CPUs as shown in FIG. 7 provides better balancing of CPU usage across the CPUs and a decrease in latency in responding to network client requests for file access.

The particular assignment of interrupts and code threads to the core CPUs affects CPU usage and response latency in a complex way. In general, latency is increased when all interrupts are managed or routed by a single CPU. The processing of interrupts is serialized when the interrupts are processed a single CPU, so it increases the response time for interrupted applications. Having interrupts routed to more than one CPU allows parallelism and decreases latency. Interference between conflicting tasks also leads to latency as threads are stalled. CPU usage is still required for servicing the stalled threads in such a way that execution of the stalled threads is resumed quickly once the conflicts are resolved. Thus, a rigid assignment of the interrupts and code threads to the core CPUs may avoid interference between conflicting tasks, but a rigid assignment may result in an imbalance of CPU usage.

A general approach to addressing the problem of assigning interrupts and code threads to the core CPUs recognizes that a rigid assignment of interrupts and code threads to the CPUs is most appropriate for interrupts and code threads that present the highest priority in terms of a need for timely execution for avoidance of costly conflicts. According to this ranking of priority, network adapter interrupts and disk adapter interrupts have the highest priority, followed by network stack processing, followed by disk adapter servicing, followed by file system processing.

Under the assumption that file system processing should have the least rigid assignment to the CPUs, the NFS threads 131 in FIG. 7 are placed in the soft affinity queues 94. For example, initially sixty-four instances of an NFS thread are placed in each of the soft affinity queues, so that there are a total of 512 instances of the NFS thread managed by the thread manager. NFS request processing is often waiting for network and disk processing, and interference between the higher priority threads is more costly and better avoided by more rigid assignment of the higher priority threads to the CPUs. The thread manager automatically deals with any CPU load imbalance (caused in part by a rigid assignment of the interrupts and high priority threads) by moving at least some of the soft affinity NFS threads 131 from the soft affinity queues of the more heavily-loaded CPUs to the soft affinity queues of the more lightly-loaded CPUs so that the more lightly-loaded CPUs execute the majority of the NFS threads. In this fashion, file access request processing by the file system stack for a multitude of concurrent file access requests is load balanced over the core CPUs.

Under the assumption that interrupts should be assigned rigidly for best conflict avoidance, CPU usage due to the network adapter interrupts and disk adapter interrupts was measured for the system in FIG. 6. It was found that the time for handling the network adapter interrupts was almost insignificant (less than 1% CPU 0 usage) but the time for handling the disk adapter interrupts was significant (6% of CPU usage even if each disk adapter interrupt was mapped to a different CPU). Therefore, to avoid conflicts caused by the significant CPU usage for handling the disk adapter interrupts, the disk adapter interrupts in FIG. 7 are mapped to more than one CPU different from CPU 0, and the disk adapter interrupts no longer interrupt network stack processing.

Figure 8:
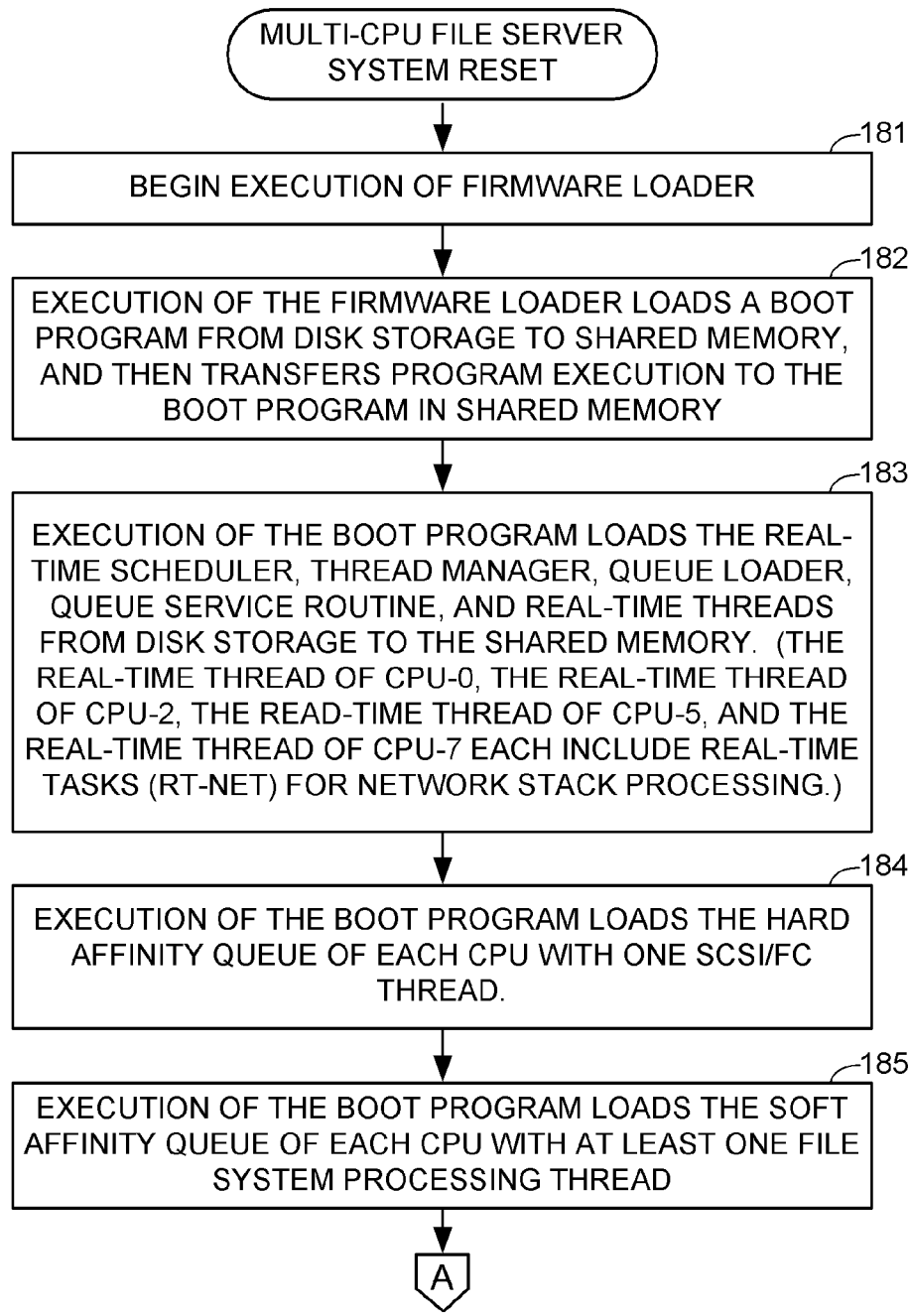
FIGS. 8 and 9 together comprise a flowchart of the loading of the code threads of FIG. 7 into the memory of the network file server in response to a system reset.

Because CPU 0 is no longer interrupted by disk adapter interrupts in FIG. 8, CPU 0 can handle the "timer tic" interrupts and the network adapter interrupts without significant interference.

As shown in FIG. 7, the network adapter interrupts 190 are still mapped to CPU 0. The interrupt 191 from the disk adapter 35 is mapped to CPU 4. The interrupt 192 from disk adapter 36 is mapped to CPU 6. The interrupt 193 from disk adapter 37 is mapped to CPU 1. The interrupt 194 from disk adapter 38 is mapped to CPU 3. CPU 4 has a disk adapter request queue 132, CPU 6 has a disk adapter request queue 133, CPU 1 has a disk adapter request queue 134, and CPU 3 has a disk adapter request queue 135. By providing a separate disk adapter request queue for each CPU interrupted by disk adapter interrupts, more efficient use is made of the level-one and level-two caches. For example, each disk adapter queue has an associated Mutex and Condition Variable stored per CPU and aligned on the boundaries of the level-two cache. Therefore the lock status and an or empty or full condition of each disk adapter queue can be read from or written to the level-two cache associated with the queue in a single atomic operation.

The network stack processing should be performed on at least one pair of dedicated CPUs sharing a level-two cache. So long as the disk adapter interrupts do not interrupt network stack processing, no more that four CPUs are needed for network stack processing even if CPU 0 is one of these four CPUs. Latency in network stack processing affects latency in responding to client requests, and the effect is often significant for client access to the in-core file system. Therefore not only is the network stack processing affined to certain CPUs but also the network stack processing is included in the real-time threads of these CPUs. In this fashion, it is possible to decrease the latency in the network stack processing.

It is desirable for the CPU handling the network adapter interrupts (CPU 0) to be one of the CPUs handling the network stack processing so that the TCP/IP state changed by the network adapter interrupt handling routine may often be accessed from the L1 cache by the real-time thread handling the low-level IP processing. Thus, at least the real-time thread (RT-NET 136) of CPU 0 and preferably also the real-time thread (RT-NET 137) of CPU 2 (which shares the level-two cache 57 with CPU 0) should perform this low-level IP processing. This low-level IP processing receives IP packets from the network adapters and sends IP packets to the network adapters.

In FIG. 7, the real-time threads (RT-NET 138 and RT-NET 139) of CPU 5 and CPU 7 also perform network stack processing, including the high-level network stack processing that services the network transmit and receive buffers (96 in FIG. 2). This high-level network stack processing loads the receive buffers with data from the network adapters, and sends data from the transmit buffers to the network adapters. The respective real-time threads 136, 137 of CPU 0 and CPU 2 may also perform high-level network stack processing in their spare time.

It is desirable to use at least four SCSI/FC hard affinity threads kept on respective hard affinity queues of at least the CPUs interrupted by the disk adapters. No more than one SCSI/FC thread need be kept on the hard affinity queue of each CPU. The SCSI/FC thread on the hard affinity queue of each CPU handling disk adapter interrupts services the disk adapter request queue of that CPU. Each of the CPUs may have an SCSI/FC thread on its hard affinity queue. Multiple SCSI/FC threads can efficiently service queues assigned to the CPUs with an appropriate assignment of the SCSI/FC threads to hard affinity queues and priority servicing keeping in mind L2 cache sharing between respective pairs of the CPUs.

For example, as shown in FIG. 7, each hard affinity queue holds one SCSI/FC thread and each SCSI/FC thread services a respective one of the disk adapter request queues. The disk adapter request queue 132 is serviced by the SCSI/FC thread 151 in the hard affinity queue 141 of CPU 0, and by the SCSI/FC thread 153 in the hard affinity queue 143 of CPU 4. The disk adapter request queue 133 is serviced by the SCSI/FC thread 152 in the hard affinity queue 142 of CPU 0, and by the SCSI/FC thread 154 in the hard affinity queue 144 of CPU 6. The disk adapter request queue 134 is serviced by the SCSI/FC thread 155 in the hard affinity queue 145 of CPU 1, and by the SCSI/FC thread 157 in the hard affinity queue 147 of CPU 5. The disk adapter request queue 135 is serviced by the SCSI/FC thread 156 in the hard affinity queue 146 of CPU 3, and by the SCSI/FC thread 158 in the hard affinity queue 148 of CPU 7.

Figure 9:
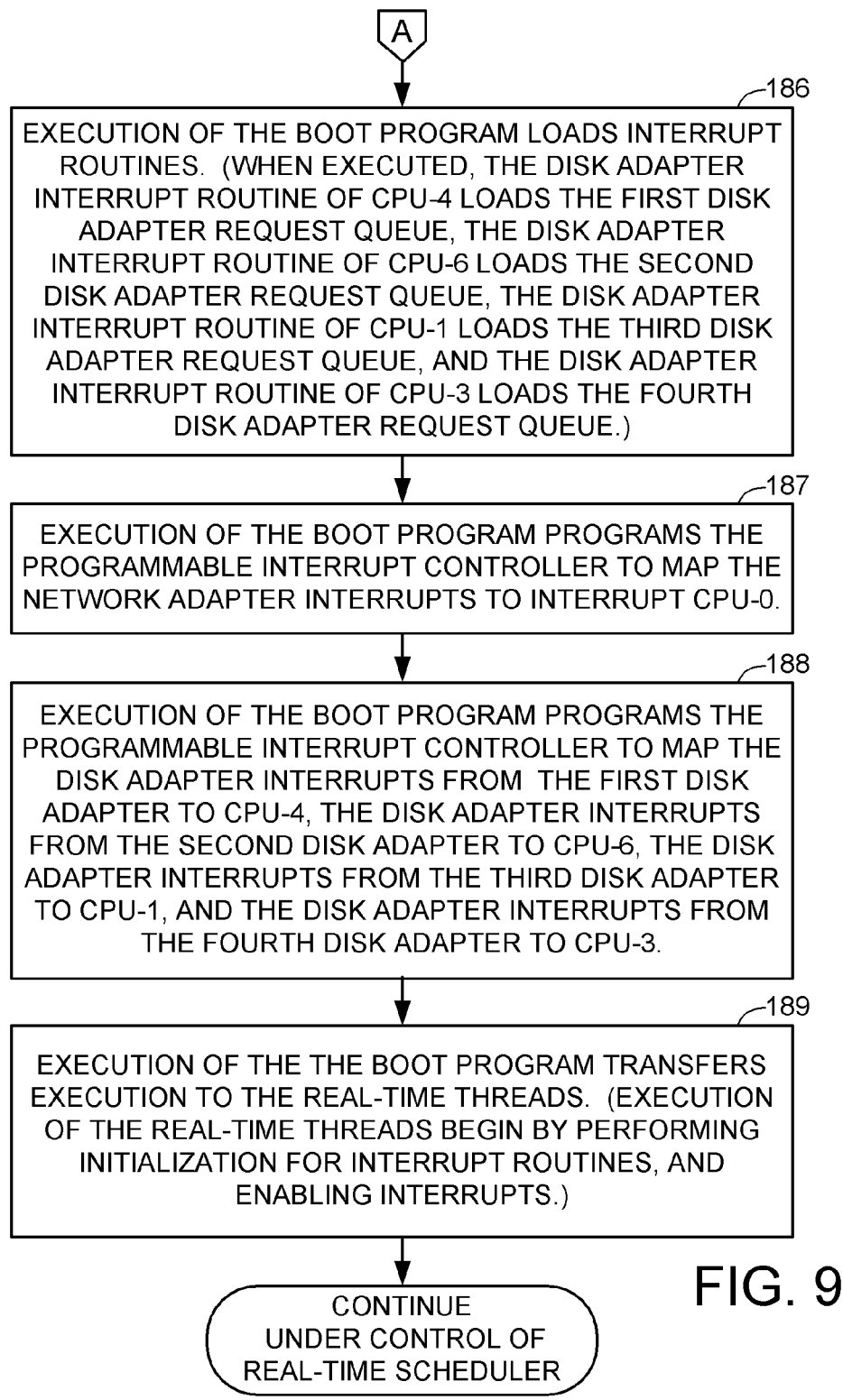

FIGS. 8 and 9 together show the loading of the code threads of FIG. 7 into the shared memory of the network file server in response to a system reset. In step 181, CPU-0 begins execution of a firmware loader routine. In step 182, execution of the firmware loader loads a boot program from the disk storage to the shared memory, and then transfers execution to the boot program in shared memory. In step 183, execution of the boot program loads the real-time scheduler, thread manager, queue loader, queue service routine, and real-time threads from disk storage to the shared memory. The real-time thread of CPU 0, the real-time thread of CPU 2, the real-time thread of CPU 5, and the real-time thread of CPU 7 each include a series of instructions (RT-NET) for network stack processing.

In step 184, execution of the boot program loads the hard affinity queue of each CPU with one SCSI/FC thread. In step 185, execution of the boot program loads the soft affinity queue of each CPU with at least one file system processing thread. Execution continues from step 185 to step 186 in FIG. 9.

In step 186 of FIG. 9, execution of the boot program loads the interrupt routines. When executed, for the example shown in FIG. 7, the disk adapter interrupt routine of CPU 4 loads the first disk adapter request queue, and the disk adapter interrupt routine of CPU 6 loads the second disk adapter request queue, the disk adapter interrupt routine of CPU 1 loads the third disk adapter request queue, and the disk adapter routine of CPU 3 loads the fourth disk adapter request queue. In step 187, execution of the boot program programs the programmable interrupt controller to map the network adapter interrupts to interrupt CPU 0.

In step 188, for the example shown in FIG. 7, execution of the boot program programs the programmable interrupt controller to map the disk adapter interrupts from the first disk adapter to CPU 4, the disk adapter interrupts from the second disk adapter to CPU 6, the disk adapter interrupts from the third disk adapter to CPU 1, and the disk adapter interrupts from the fourth disk adapter to CPU 3. In step 189, execution of the boot program transfers execution to the real-time threads. Execution of the real-time threads begin by performing initialization for interrupt routines and enabling interrupts. After step 189, execution continues under control of the real-time scheduler, because the interrupts enabled in step 189 include the "timer tic" interrupt which drives the real-time scheduler.

The present invention more particularly concerns modification of the conventional real-time task scheduler of FIGS. 4 and 5 to facilitate the conversion of a single-threaded network stack to a multi-threaded network stack. In particular, the modified real-time task scheduler is used by the core CPU's in the network file server that perform the real-time network processing tasks. In FIG. 7, for example, CPU-0, CPU-2, CPU-5, and CPU-7 perform the real-time network processing tasks, which are designated as RT-NET 136, 137, 138, and 139, respectively.

Figure 10:
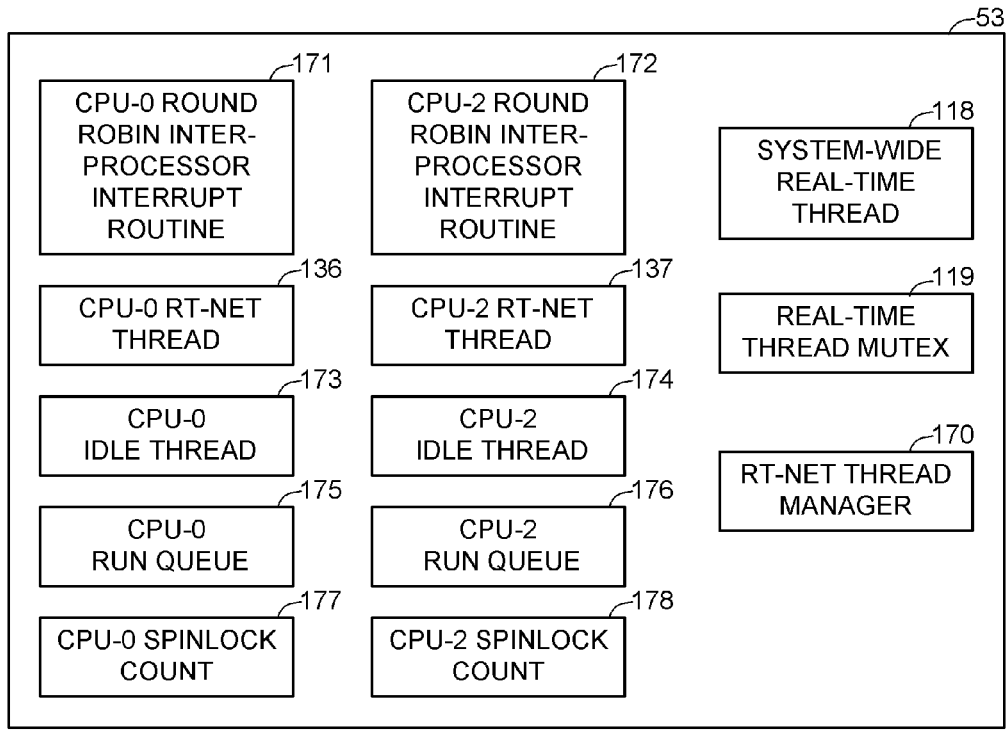
FIG. 10 is a block diagram of code threads and data structures used by two of the CPUs in the network file server of FIG. 7.

As further shown in FIG. 10, each core CPU that performs the real-time network processing tasks, such as CPU-0 and CPU-2, has a respective instance of a round-robin inter-processor interrupt routine (171, 172), a respective RT-NET thread (136, 137), a respective idle thread (173, 174), a respective run queue (175, 176), and a respective per-CPU spinlock count (177, 178). The CPUs time-share execution of the system-wide thread 118 by successively taking and releasing the system real-time thread mutex 119. In addition, there is a system-wide real-time network (RT-NET) thread manager 170 for registering RT-NET tasks performed by the RT-NET threads (136, 137).

In general, it is desired to give the RT-NET thread (136, 137) of any CPU priority over the system-wide real-time thread 118 except CPU 0 so long as there is work for the RT-NET thread to do. It is desired to share execution of the system-wide real-time thread 118 among the CPUs. It is desired for each CPU to time-share any remaining processing time among any GP threads in the run queue (175, 176) of the CPU. If there is no work for the RT-NET thread of a CPU and the system-wide real-time thread 118 is currently running on another CPU (as indicated by the real-time thread mutex 119) and the run queue (175, 176) of the CPU is empty, then the CPU executes its idle thread (173, 174).

Figure 11:
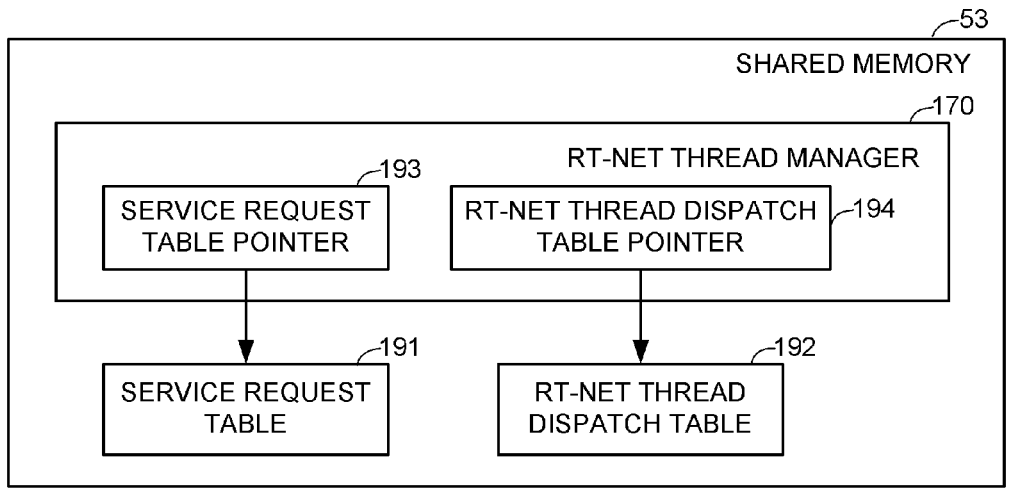
FIG. 11 is a block diagram of a real-time network (RT-NET) thread manager introduced in FIG. 10.

FIG. 11 shows details of the system-wide RT-NET thread manager 170 in the shared memory 53. The RT-NET thread manager maintains a service request table 191 and an RT-NET thread dispatch table. A service request table pointer 193 links the RT-NET thread manager 170 to the service request table 181. An RT-NET thread dispatch table pointer 194 links the RT-NET thread manager 170 to the RT-NET thread dispatch table 192. The service request table 191, for example, has sixty-four service request entries for each RT-NET thread. The RT-NET thread dispatch table, for example, includes one entry for each RT-NET thread.

In operation, an application or kernel process requests the RT-NET thread manager to register an RT-NET task by sending a service request to the RT-NET thread manager. The RT-NET thread manager 170 responds by allocating an entry in the service request table to the service request, assigning a CPU to the service request, allocating a per-CPU index value to the request, and placing an identifier of the assigned CPU and the allocated per-CPU index value in the allocated entry in the service request table. The RT-NET thread manager then returns a cookie including the identifier of the assigned CPU and the allocated per-CPU index value of the request. The cookie is included later in one or more requests to activate the task. Any activated tasks assigned to a CPU are performed when the CPU executes its RT-NET thread.

The registration of the RT-NET tasks for each CPU may occur during execution of a configuration or initialization routine of the system. For example, the RT-NET manager 170 is a module of the boot program, and the boot program may invoke the configuration or initialization routines of the RT-NET threads before enabling the interrupts (in step 189 in FIG. 9).

Figure 12:
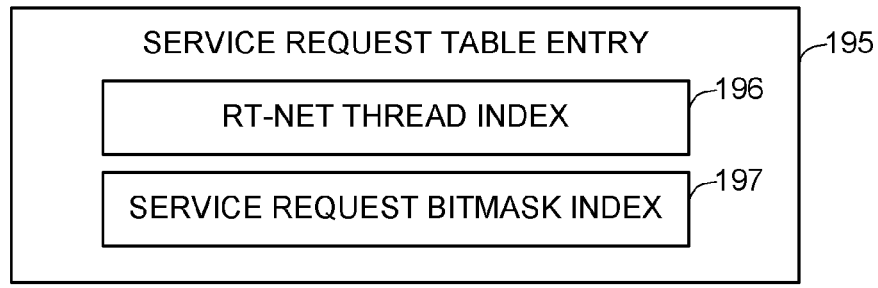
FIG. 12 is a block diagram of an entry of a service request table introduced in FIG. 11.

FIG. 12 shows an entry 195 in the service request table (191 in FIG. 11). The entry 195 includes an RT-NET thread index 196, which is an identifier of the CPU assigned to perform the registered RT-NET task. The entry also includes a service request bitmask index 197, which is an allocated per-CPU index value for the registered RT-NET task.

Figure 13:
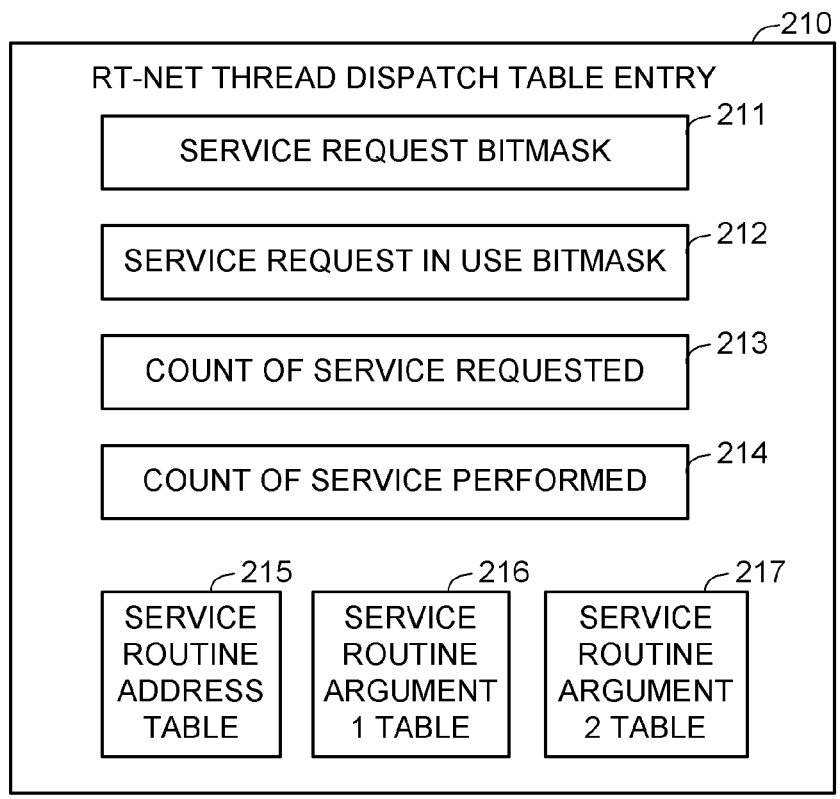
FIG. 13 is a block diagram of an entry of an RT-NET thread dispatch table introduced in FIG. 11.

FIG. 13 shows an entry 210 in the RT-NET thread dispatch table (192 in FIG. 12). Each such entry 210 corresponds to a particular one of the RT-NET threads. The entry 210 includes a service request bitmask 211, a service request in use bitmask 212, a count of service requested 213, a count of service performed 214, a service routine address table 215, a first service routine argument table 216, and a second service routine argument table 217. For example, each of the bitmasks 211, 212 has sixty-four bits, and each of the service routine tables 215, 216, 217 has sixty-four entries. In this case, each RT-NET thread dispatch table entry may store information for up to sixty-four registered tasks assigned to the CPU corresponding to the RT-NET thread dispatch table entry.

The service request bitmask has a respective bit for each RT-NET task registered to the CPU corresponding to the RT-NET thread dispatch table entry. The respective bit in the service request bitmask 211 is either set or clear to indicate whether or not a corresponding RT-NET task assigned to the core CPU is either activated or not. The service request in use bitmask has a respective bit that is set when the corresponding RT-NET thread dispatch table entry is registered and the bitmask index is allocated to the registered RT-NET task. The count of service requested indicates the number of registered RT-NET tasks that have been activated. The count of service performed indicates the number of RT-NET tasks that have been performed during execution of the RT-NET thread for the CPU.

When the RT-NET thread manager receives a request to register an RT-NET task, the registration request specifies a services routine address and up to two optional arguments. The bitmask index value assigned to the registered task is also used to index the service routine address table 215 to store the specified service routine address into the service routine address table 215. If the registration request specifies a first argument, then the bitmask index is also used to index the service routine argument 1 table 216 to store the first argument into the service routine argument 1 table. If the registration request specifies a second argument, then the bitmask index is also used to index the service routine argument 2 table 217 to store the second argument into the service routine argument 2 table.

Figure 14:
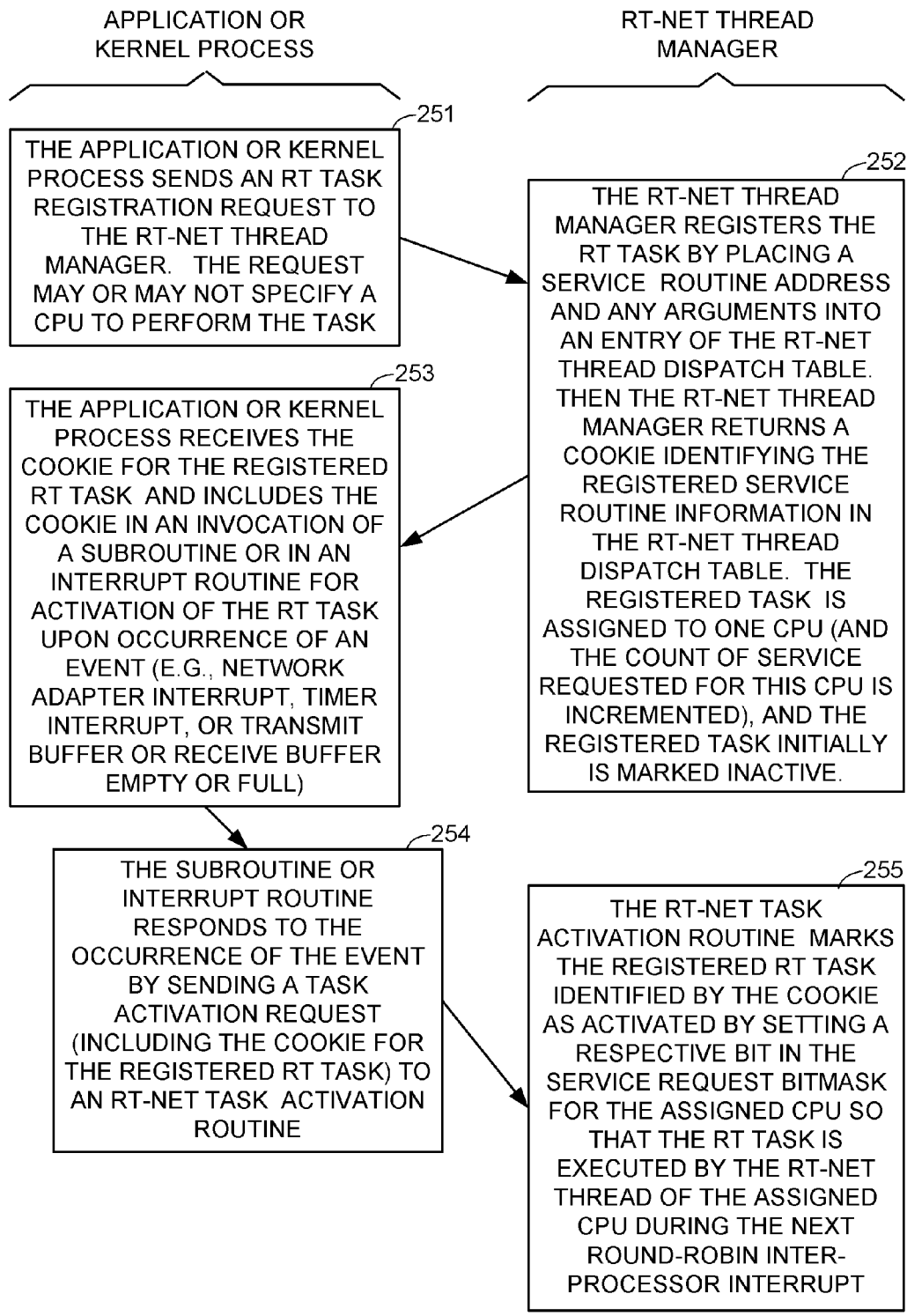
FIG. 14 is a flow diagram of a protocol between an application or kernel process and the real-time scheduler of FIG. 11 for registering a real-time task and activating the real-time task.

FIG. 14 shows the protocol of task registration and task activation. In a first step 251, the application or kernel process sends a request to the RT-NET thread manager to register a specified RT-NET task. The request specifies a service routine address and up to two optional arguments. The request may or may not specify a particular RT-NET thread to perform the task when the task has been activated. Then, in step 252, the RT-NET thread manager registers the RT task by placing the service routine address and any arguments into an entry of the RT-NET thread dispatch table for the specified RT-NET thread or for an assigned RT-NET thread, and then the RT-NET thread manager returns a cookie identifying the RT-NET thread assigned to perform the registered task and including the service request bitmask index value assigned to the registered task. The indexed bit in the service request bitmask initially is cleared to indicate that the registered task is initially inactive.

In step 253, the application or kernel process receives the cookie for the registered task, and includes the cookie in an invocation of a subroutine or in an interrupt routine for activation of the task upon occurrence of an event (e.g., network adapter interrupt, timer interrupt, or transmit buffer or receive buffer empty or full). In step 254, the subroutine or interrupt routine responds to the occurrence of the event by sending a task activation request (including the cookie for the registered RT task) to an RT-NET task activation routine. Finally, in step 255, the RT-NET task activation routine marks the task list entry as activated so that the RT-NET task is performed by the RT-NET thread of the specified CPU during the next round-robin inter-processor interrupt.

In step 255, the RT-NET task activation routine uses the cookie to calculate a shared memory address of a byte or word including the bit for the task in the service request bitmask. The bit for the task is set by execution of a single instruction upon this byte or word of the service request bitmask. A specific example is further described below with reference to FIG. 25. Because such a single instruction executes as an atomic operation, the RT-NET task activation routine is easily incorporated into any application or kernel program or interrupt routine without need to obtain a mutex or spinlock to avoid conflict between threads executed by different CPUs. Thus, by using any conventional method of sharing the shared memory among the multiple core CPUs, an RT-NET task activated by a GP thread running on one core CPU can be serviced by the assigned RT-NET thread of another core CPU in response to the next round-robin inter-processor interrupt.

In general, a registered RT-NET task for a CPU can be a subroutine for performing any kind of task. For example, the network adapter interrupt routines (70 in FIG. 2), routines of the TCP layer (77 in FIG. 2) and the IP layer (78 in FIG. 2) are split into routines for detecting events, service routines for performing tasks upon occurrence of the events, and higher-level routines that use the results of the service routines. The routines for detecting events are modified to include or invoke the RT-NET task activation routine. The service routines are modified for call-back or referral to the higher-level routines that use their results, and particular CPUs are selected for execution of the service routines upon occurrence of the events. The optional service routine arguments (in the tables 216, 217 in FIG. 13) provide additional context for execution of the service routine.

In practice, a real-time task is likely to be either a periodic tasks or an asynchronous task. A periodic task is a way of efficiently performing a task at a relatively low rate compared to the rate of the round-robin inter-processor interrupt. An asynchronous task is a way of efficiently performing a task at a relatively high rate compared to the rate of the round-robin inter-processor interrupt.

Figure 15:
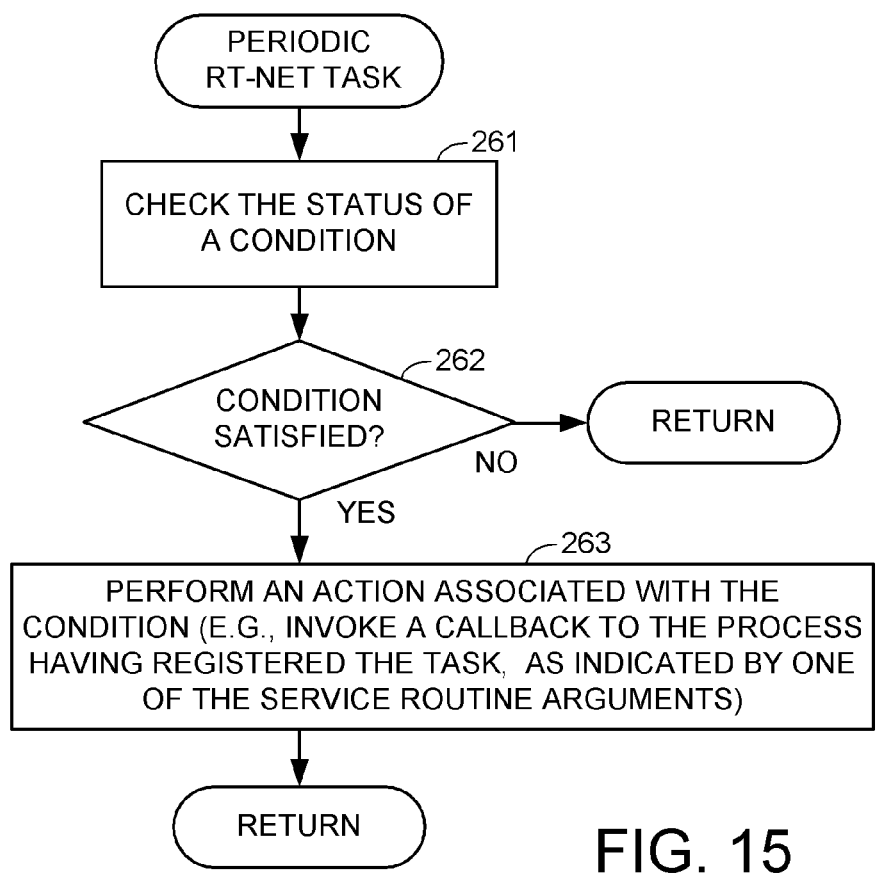
FIG. 15 is a flowchart of a periodic real-time task.

FIG. 15 shows a periodic RT-NET task. In a first step 261, the status of a condition is checked. For example, the condition is whether the time out waiting for acknowledgement of a transmitted packet has occurred. In step 262, if the condition is not satisfied, then execution returns. Otherwise, if the condition is satisfied, execution continues to step 263. In step 263, an action associated with the condition is executed. For example, the action is to retransmit the packet. After performing the action in step 263, execution returns. In this example, the periodic task will re-arm the timer. When the timer expires, the timer routine will re-activate the RT-NET task by setting the bit for the task in the service request bitmask for the RT-NET thread assigned to the task.

Figure 16:
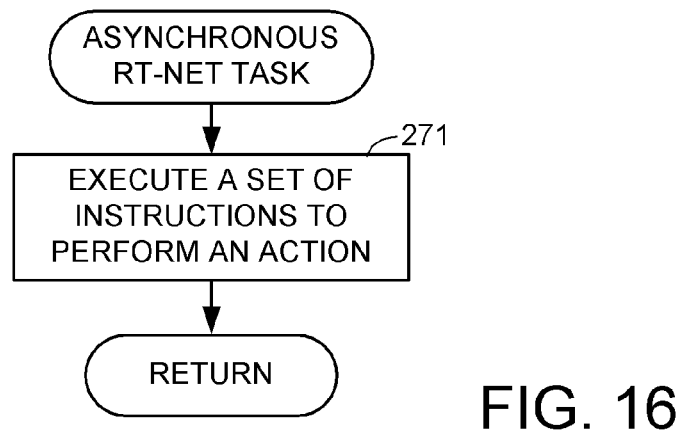
FIG. 16 is a flowchart of an asynchronous real-time task.

FIG. 16 shows an asynchronous RT-NET task. In a first step 271, a set of instructions are executed to perform an action. After step 271, execution returns. In this fashion, the action of step 271 is performed once each time that the real-time task is activated. For example, the real-time task is activated by an interrupt routine. This is especially advantageous for the case where multiple instances of the interrupt activating the task may occur between the round-robin inter-processor interrupts, yet the action (such as a call-back to the process having registered the task) need only be performed once for the multiple interrupts.

Figure 17:
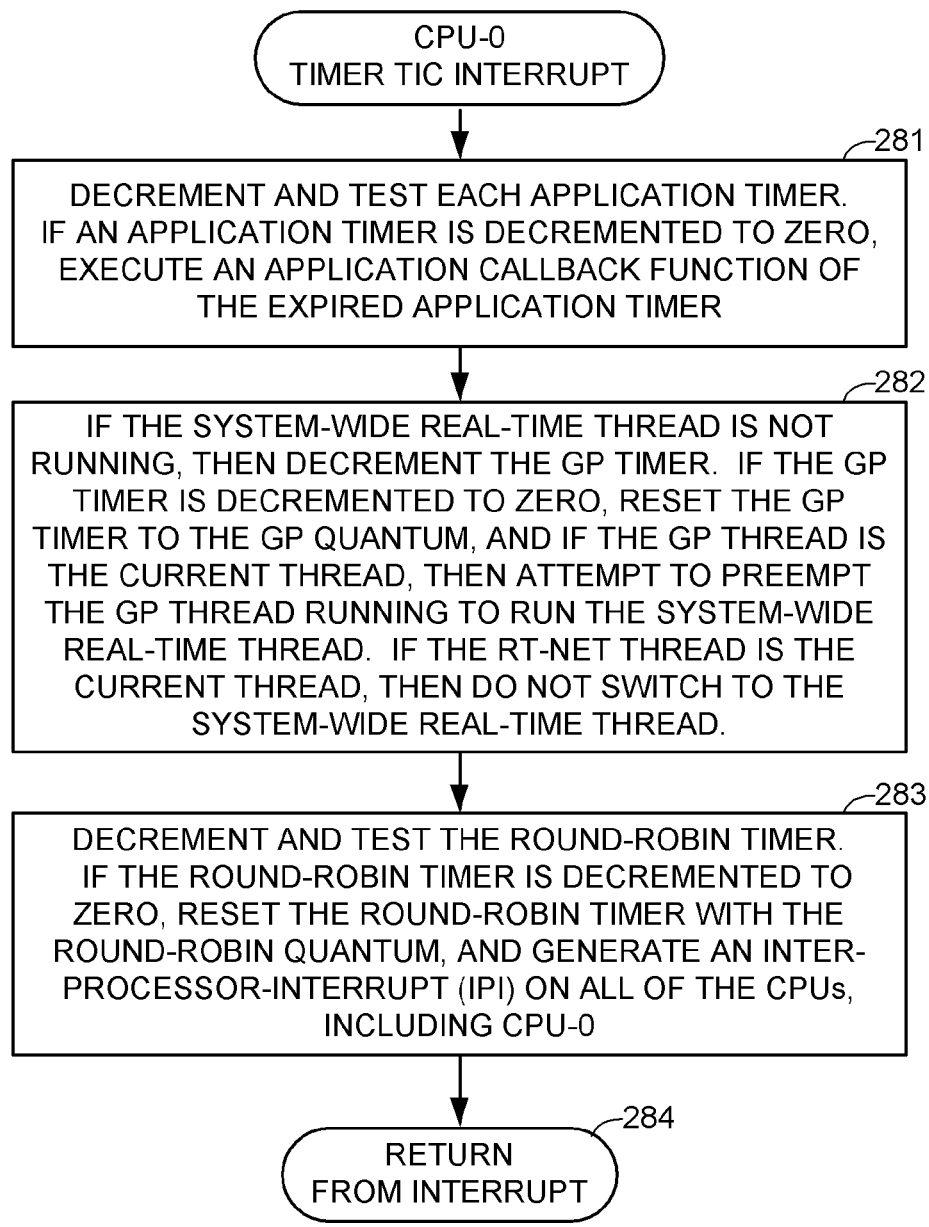
FIG. 17 is a flowchart of a CPU-0 timer tick interrupt routine used in the network file server of FIG. 7.

FIG. 17 shows a modification of the CPU-0 timer tick interrupt routine in order to permit CPU-0 to have an RT-NET thread executed in the preferred way. All that is desired is that the CPU-timer tick interrupt routine should not switch execution to the system-wide real-time thread if the RT-NET thread was being executed at the time of the CPU-0 timer tic interrupt. Thus, the CPU-0 timer tick interrupt routine should recognize a case where the current thread at the time of the CPU-0 timer tick interrupt is the RT-NET thread instead of a GP thread so that the RT-NET thread is not preempted to run the system-wide real-time thread in this case.

For example, in the first step 281, execution of CPU 0 decrements and tests each application timer. If an application timer is decremented to zero, then an application callback function of the timer is executed.

In the second step 282, if the system-wide real-time thread is not currently running (i.e., the real-time thread mutex is not presently held by any CPU), then the GP timer is decremented. If the GP timer is decremented to zero, then the GP timer is reset to the GP quantum, and if the GP thread is the current thread, then an attempt is made to preempt the GP thread running to run the system-wide real-time thread. If the RT-NET thread is the current thread, then execution is not switched to the system-wide real-time thread.

In the final step 283, the round-robin timer is decremented and tested. If the round-robin timer is decremented to zero, then the round-robin timer is reset with the round-robin quantum, and an inter-processor interrupt (IPI) is generated on all of the CPUs, including CPU-0.

Figure 18:
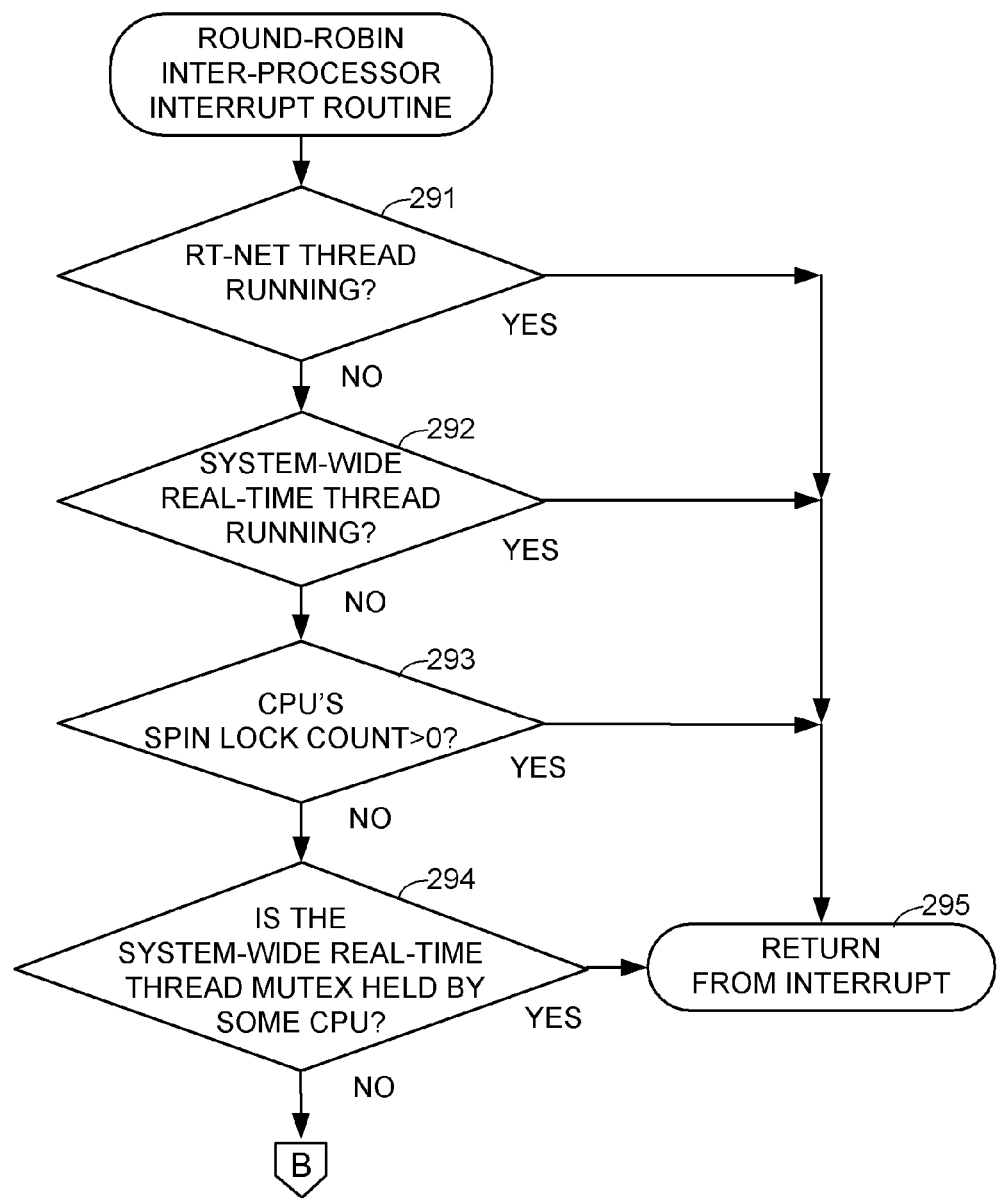
FIGS. 18 and 19 together comprise a flowchart of a round-robin inter-processor interrupt routine executed by each of the core CPUs that perform real-time network processing tasks in the network file server of FIG. 7.
Figure 19:
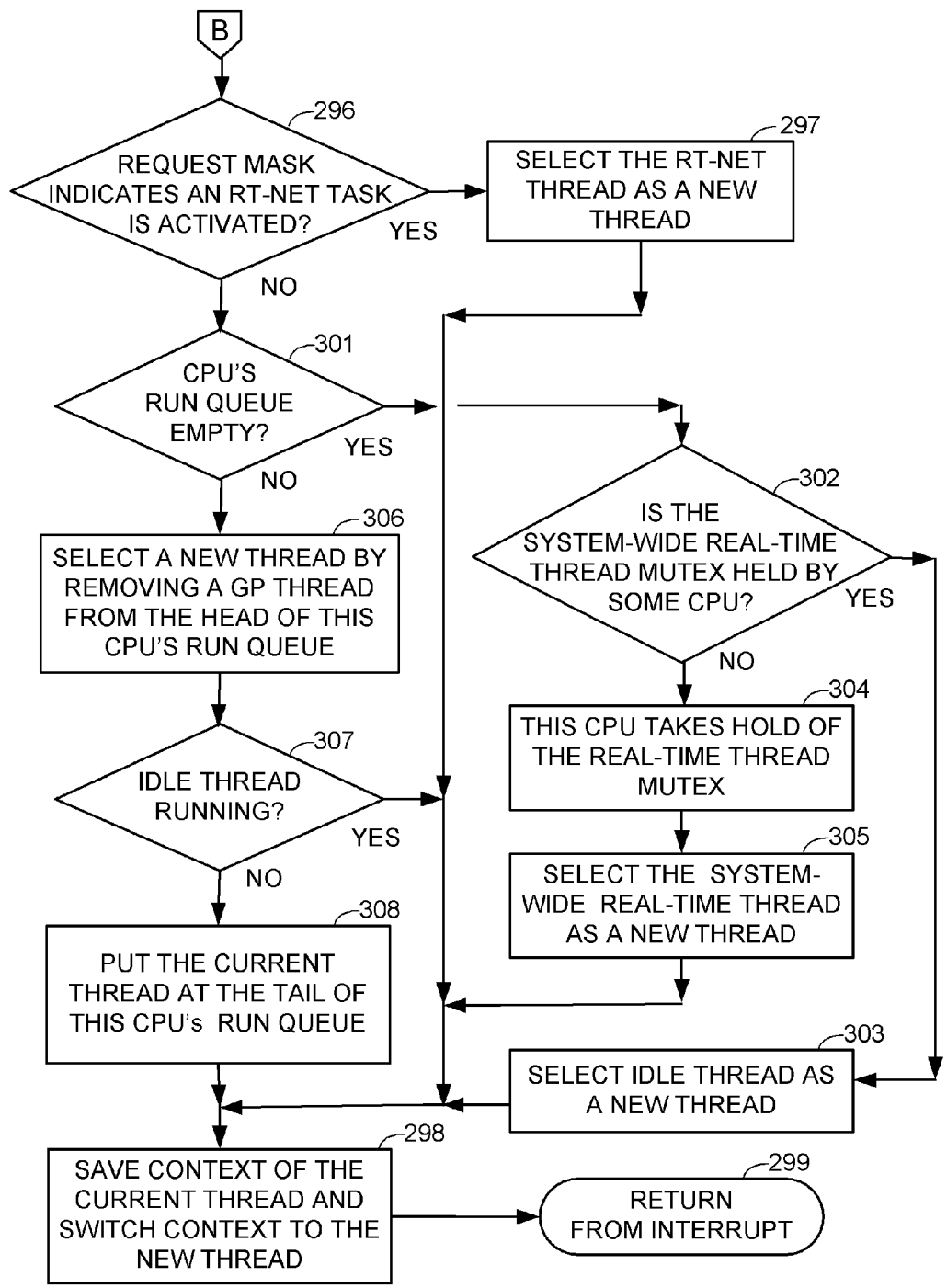

FIGS. 18 and 19 together show the round-robin inter-processor interrupt routine executed by each of the core CPUs that perform real-time network processing tasks in the network file server of FIG. 7. In a first step 291 in FIG. 18, if the RT-NET thread is running on the CPU, then execution branches to step 295 to return from the interrupt so that the RT-NET thread continues to run upon returning from the interrupt. If the RT-NET thread is not running on the CPU, then execution continues from step 291 to step 292.

In step 292, if the system-wide real-time thread is running on the CPU, then execution branches to step 295 to return from the interrupt so that the system-wide real-time thread continues to run on the CPU upon returning from the interrupt. If the system-wide thread is not running on the CPU, then execution continues from step 292 to step 293.

In step 293, if the CPU's spin lock count is greater than zero, then the current thread has taken a spinlock to prevent a context switch to a new thread upon returning from the round-robin inter-processor interrupt. In this case, execution branches from step 293 to step 295 to return from the interrupt. If the CPU's spin lock count is not greater than zero, then execution continues from step 293 to step 294.

In step 294, if this CPU is holding the system-wide real-time thread mutex (but not currently executing the system-wide real-time thread, as determined in step 292), then the current thread cannot be preempted. In this case, execution branches from step 294 to step 295 to return from the interrupt so that the current thread will continue to run. If this CPU is not holding the real-time thread mutex, then execution continues from step 294 to step 296 in FIG. 19.

In step 296 in FIG. 19, if the service request mask for this CPU indicates that an RT-NET task for this CPU is activated, then execution branches to step 297. For example, in step 296, the arithmetic value of the service request mask is compared to zero, and an RT-NET task is indicated as activated if the arithmetic value of the service request mask is not zero. In step 297, the RT-NET thread for this CPU is selected as the new thread. Execution continues from step 297 to step 298 to save the context of the current thread and switch the context to the new thread. Execution continues from step 298 to step 299 so that upon a return from the interrupt, this CPU executes the new thread.

In step 296, if the service request mask for this CPU does not indicate that an RT-NET task for this CPU is activated, then execution continues to step 301. In step 301, if the run queue of this CPU is empty, then execution branches to step 302. In step 302, if the system-wide real-time thread is held by a CPU, then execution branches to step 303 to select the idle thread for this CPU as the new thread. Execution continues from step 303 to step 298 to save the context of the current thread and switch the context to the new thread. Execution continues from step 298 to step 299 so that upon a return from the interrupt, this CPU executes the new thread.

In step 302, if the system-wide real-time thread mutex is not held by some CPU, then execution continues to step 204. In step 304, this CPU takes hold of the system-wide real-time thread mutex, and in step 305, the system-wide real-time thread is selected as a new thread. Execution continues from step 305 to step 298 to save the context of the current thread and switch context to the new thread, so that this CPU executes the system-wide real-time thread upon the return from interrupt in step 299.

In step 301, if the run queue of this CPU is not empty, then execution continues to step 306 to select a new thread by removing a general-purpose (GP) thread from the head of the CPU's run queue. Execution continues from step 306 to step 307. In step 307, if the idle thread is running, then execution branches to step 298 to save the context of the current thread and switch context to the new thread, so that upon the return from interrupt in step 299, this CPU executes the GP thread that was removed from the head of the CPU's run queue.

In step 307, if the idle thread is not running, then execution continues to step 308 to put the current thread at the tail of this CPU's run queue. Then execution continues to step 298 to save the context of the current thread and switch context to the new thread, so that upon the return from interrupt in step 299, this CPU executes the GP thread that was removed from the head of the CPU's run queue.

Figure 20:
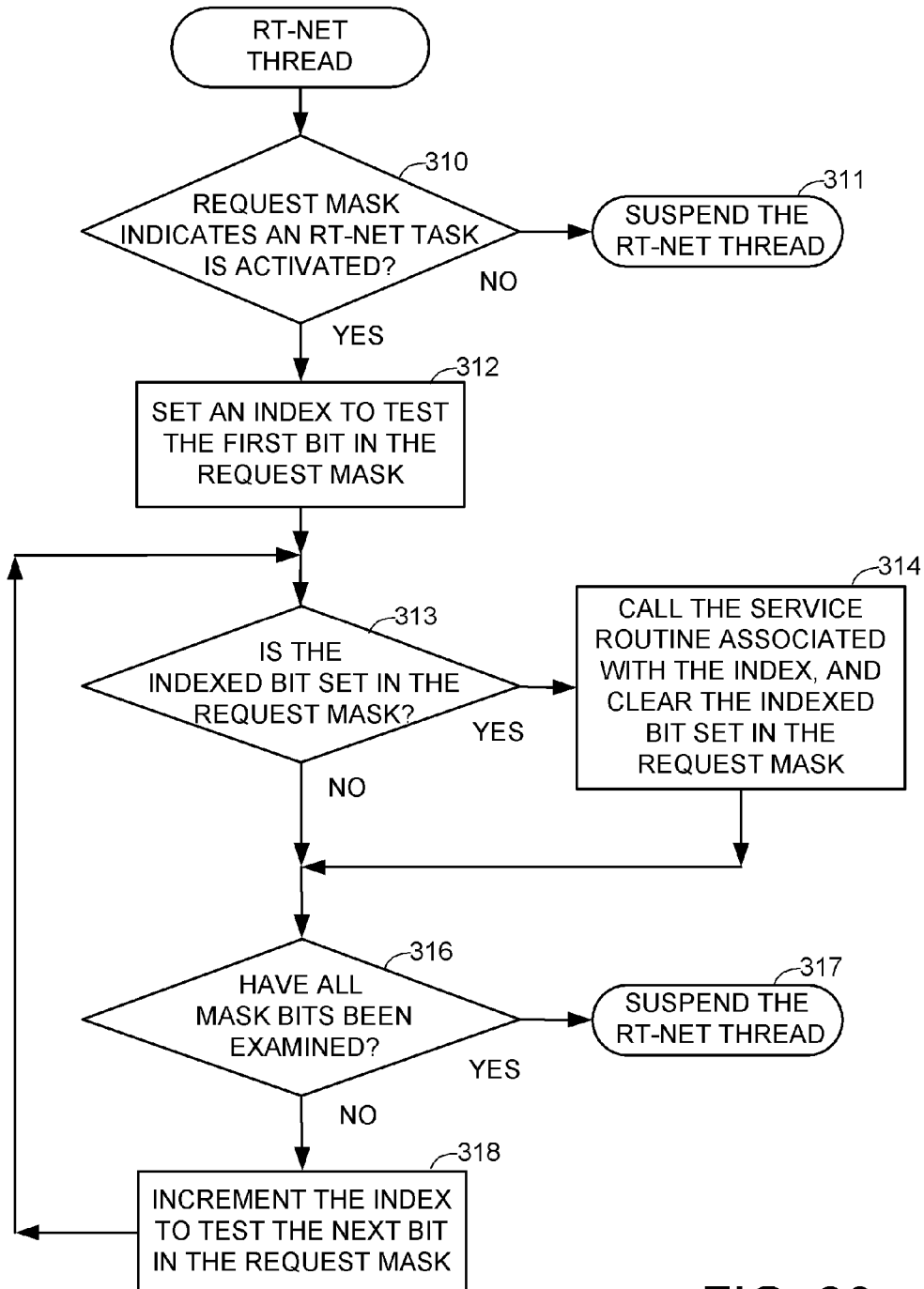
FIG. 20 is a flowchart of a real-time network processing (RT-NET) thread executed by each of the core CPUs that perform real-time network processing tasks in the network file server of FIG. 7.

FIG. 20 shows the real-time network processing (RT-NET) thread executed by each of the core CPUs that perform real-time network processing tasks in the network file server of FIG. 7. In a first step 310 of FIG. 20, if the service request mask for the CPU indicates that an RT-NET task for the CPU is not activated, then execution branches to step 311 to suspend the RT-NET thread, as further described below with reference to FIG. 21.

In step 310 of FIG. 20, if the service request mask for the CPU indicates that an RT-NET task for the CPU is activated, then execution continues from step 310 to step 312. In step 312, a scanning index is set to test the first bit in the service request mask. In step 313, if the indexed bit is set in the service request mask, then execution branches to step 314 to call the service routine associated with the index, and to clear the indexed bit set in the service request mask. Execution continues from step 314 to step 316. Execution also continues to step 316 from step 313 if the indexed bit is not set in the service request mask.

In step 316, if all of the mask bits have been examined in the service request mask, then execution branches to step 317 to suspend the RT-NET thread, as further described below with reference to FIG. 21.

In step 316, if all of the mask bits have not been examined in the service request mask, then execution continues from step 316 to step 318. In step 318, the scanning index is incremented to test the next bit in the service request mask. Execution loops back to step 313 to continue examining the bits in the service request mask.

Figure 21:
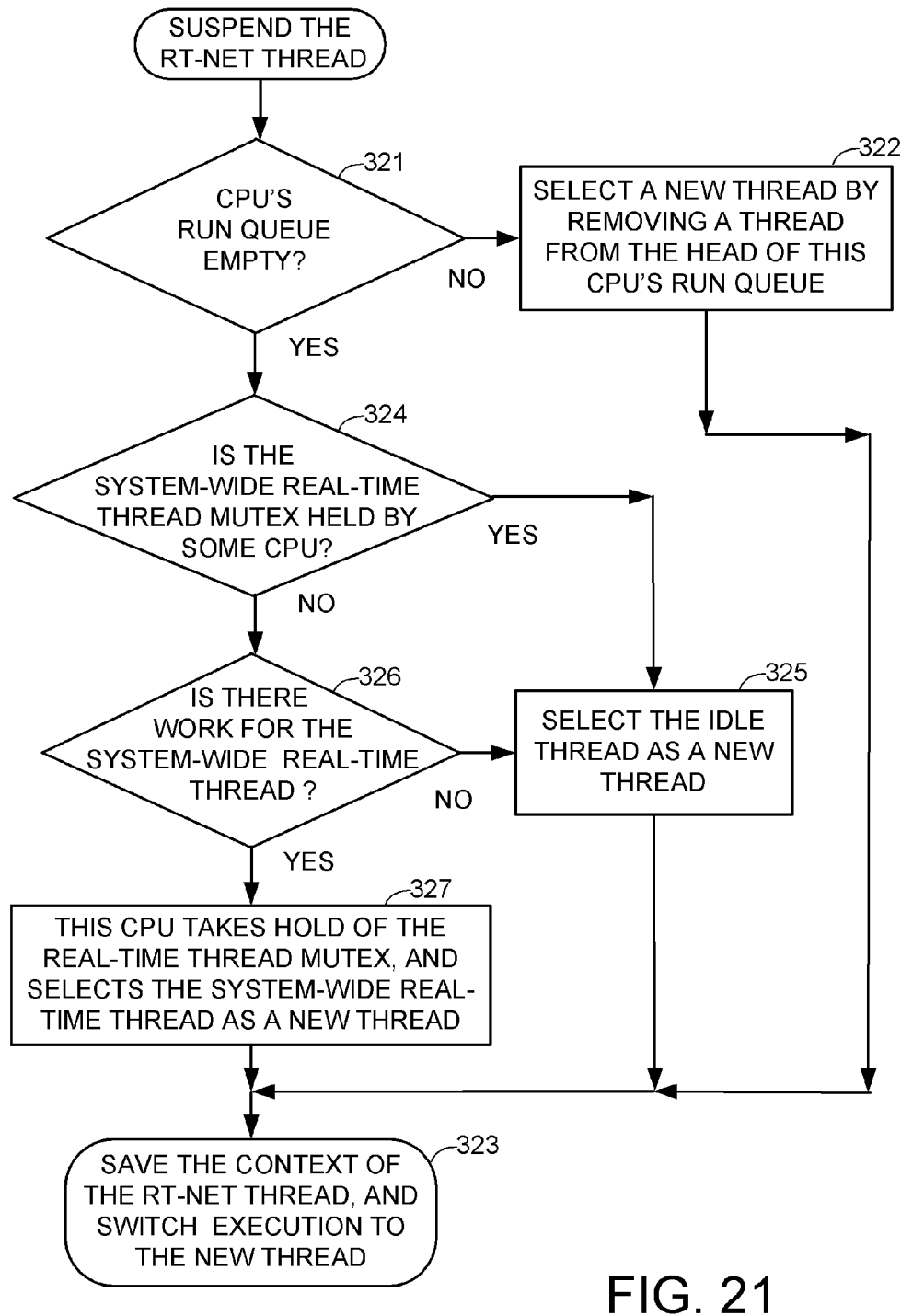
FIG. 21 is a flowchart of a routine for suspending the RT-NET thread of FIG. 20.

FIG. 21 shows the routine for suspending the RT-NET thread of a given CPU. In a first step 321, if the run queue of this CPU is not empty, then execution branches to step 322 to select a new thread by removing a thread from the head of this CPU's run queue. Execution continues from step 322 to step 323 to save the context of the RT-NET thread, and switch execution to the new thread.

In step 321, if the run queue of this CPU is empty, then execution continues to step 324. In step 324, if the system-wide real-time thread mutex is held by some CPU, then execution branches to step 325 to select the idle thread as a new thread. Execution continues from step 325 to step 323 to save the context of the RT-NET thread, and switch execution to the new thread.

In step 324 if the system-wide real-time thread mutex is not held by some CPU, then execution continues to step 326. In step 326, if there is not work for the system-wide real-time thread, then execution branches to step 325 to select the idle thread as a new thread. Otherwise, if there is work for the system-wide real-time thread, then execution continues to step 327. In step 327, this CPU takes hold of the real-time thread mutex, and selects the system-wide real-time thread as a new thread. Execution continues from step 327 to step 323 to save the context of the RT-NET thread, and switch execution to the new thread.

Figure 22:
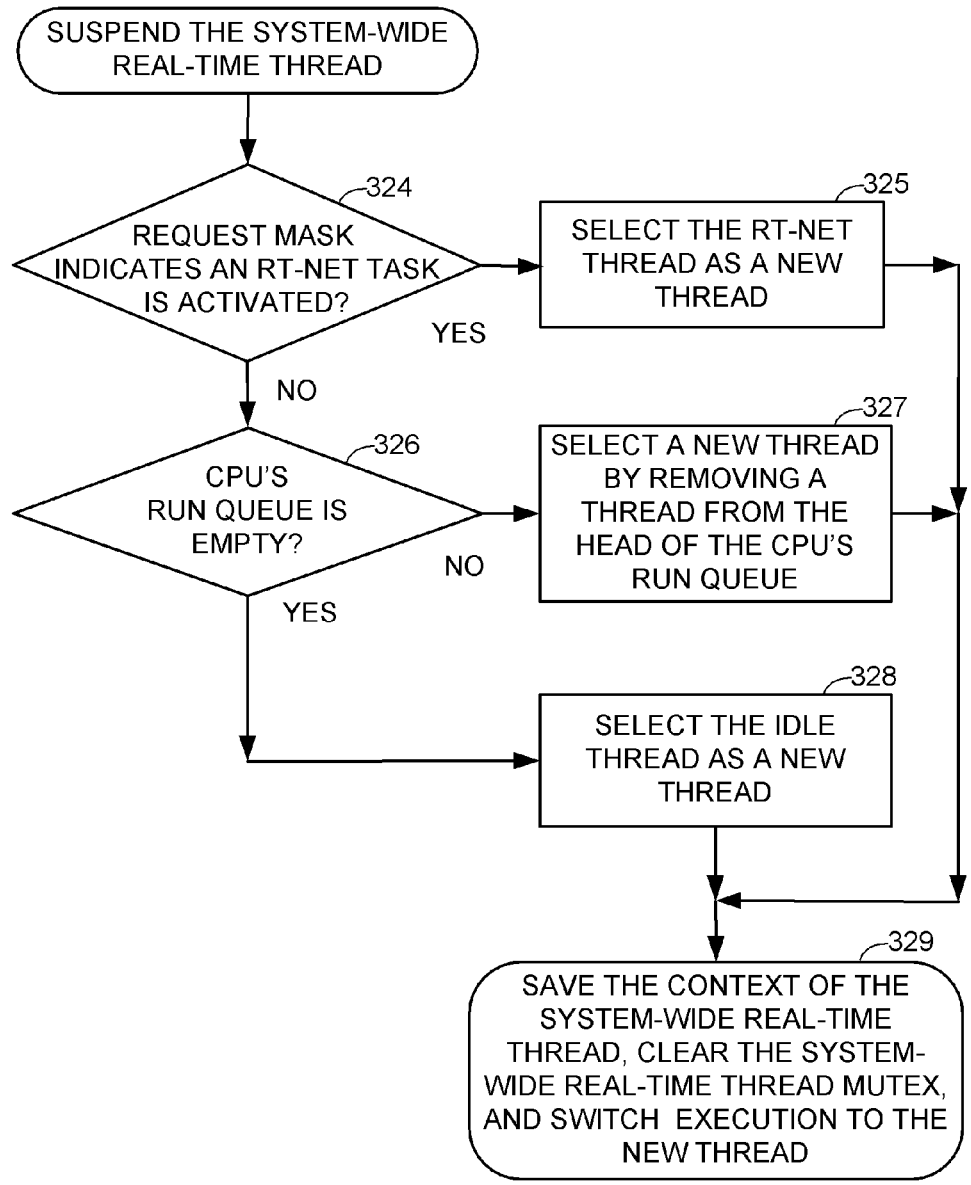
FIG. 22 is a flowchart of a routine for suspending a system-wide real-time thread.

FIG. 22 shows a routine for suspending the system-wide real-time thread. In a first step 324, if the service request mask (for the CPU currently executing the system-wide real-time thread) indicates that an RT-NET task is activated, then execution branches to step 325 to select the RT-NET thread as a new thread. Execution continues from step 325 to step 329 to save the context of the system-wide real-time thread, clear the system-wide real-time thread mutex, and switch execution to the new thread.

In step 324, if the service request mask (for the CPU currently executing the system-wide real-time thread) does not indicate that an RT-NET task is activated, then execution continues to step 326. In step 326, if the CPU's run queue is not empty, then execution branches from step 326 to step 327. In step 327, a new thread is selected by removing a thread from the head of the CPU's run queue. Execution continues from step 327 to step 329 to save the context of the system-wide real-time thread, clear the system-wide real-time thread mutex, and switch execution to the new thread.

In step 326, if the CPU's run queue is empty, then execution continues to step 328 to select the idle thread as a new thread. Execution continues from step 328 to step 329 to save the context of the system-wide real-time thread, clear the system-wide real-time thread mutex, and switch execution to the new thread.

Figure 23:
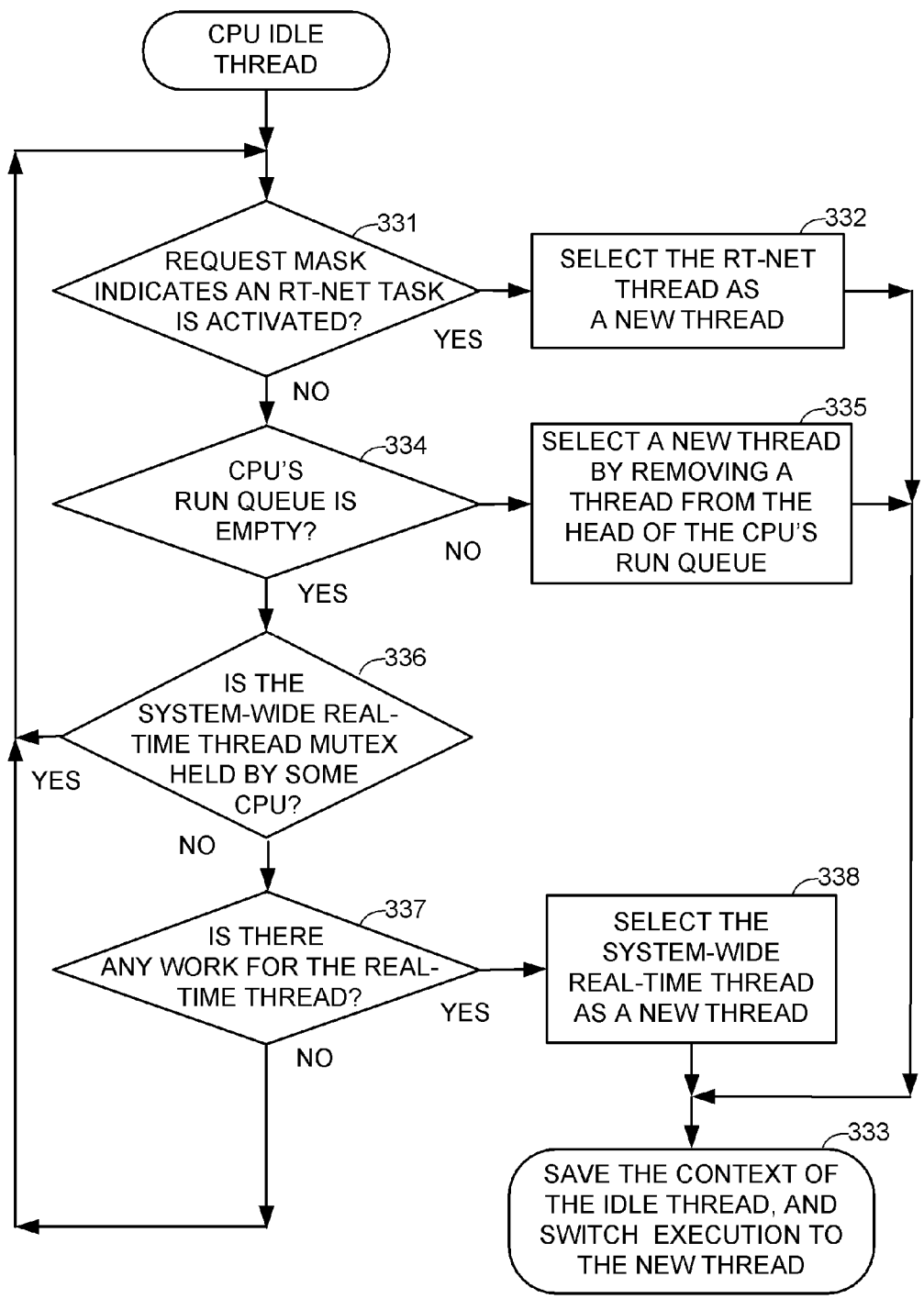
FIG. 23 is a flowchart of a CPU idle thread executed by each of the core CPUs that perform real-time network processing tasks in the network file server of FIG. 7.

FIG. 23 shows the CPU idle thread executed by each of the core CPUs that perform real-time network processing tasks. In a first step 331, if the service request mask for the CPU indicates that an RT-NET task is activated, then execution branches to step 332 to select the RT-NET thread as a new thread. Execution continues from step 332 to step 333 to save the context of the idle thread, and switch execution to the new thread.

In step 331, if the service request mask for the CPU does not indicate that an RT-NET task is activated, then execution continues to step 334. In step 334, if the CPU's run queue is not empty, then execution branches to step 335 to select a new thread by removing a thread from the head of the CPU's run queue. Execution continues from step 335 to step 333 to save the context of the idle thread, and switch execution to the new thread.

In step 334, if the CPU's run queue is empty, then execution continues from step 334 to step 336. In step 336, if the system-wide real-time thread mutex is held by some CPU, then execution loops back to step 331. Otherwise, execution continues from step 336 to step 337. In step 337, if there is not any work for the system-wide real-time thread, then execution loops back to step 331. Otherwise, if there is work for the system-wide real-time thread, then execution branches from step 337 to step 338. In step 338, the system-wide real-time thread is selected at a new thread. Execution continues from step 338 to step 333 to save the context of the idle thread, and switch execution to the new thread.

Figure 24:
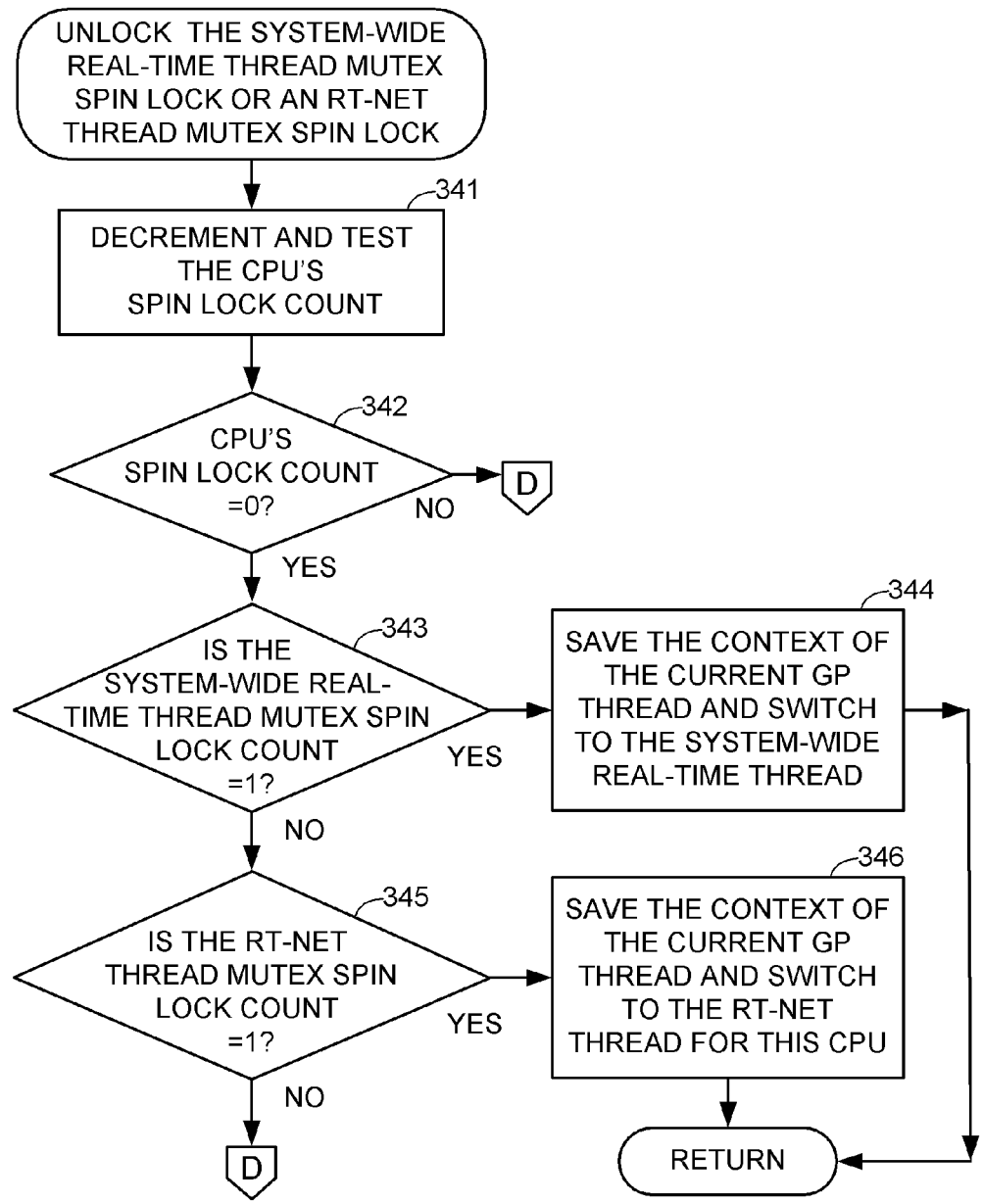
FIGS. 24 and 25 together comprise a flowchart of an unlock routine called by a general-purpose (GP) thread to unlock a real-time thread lock.
Figure 25:
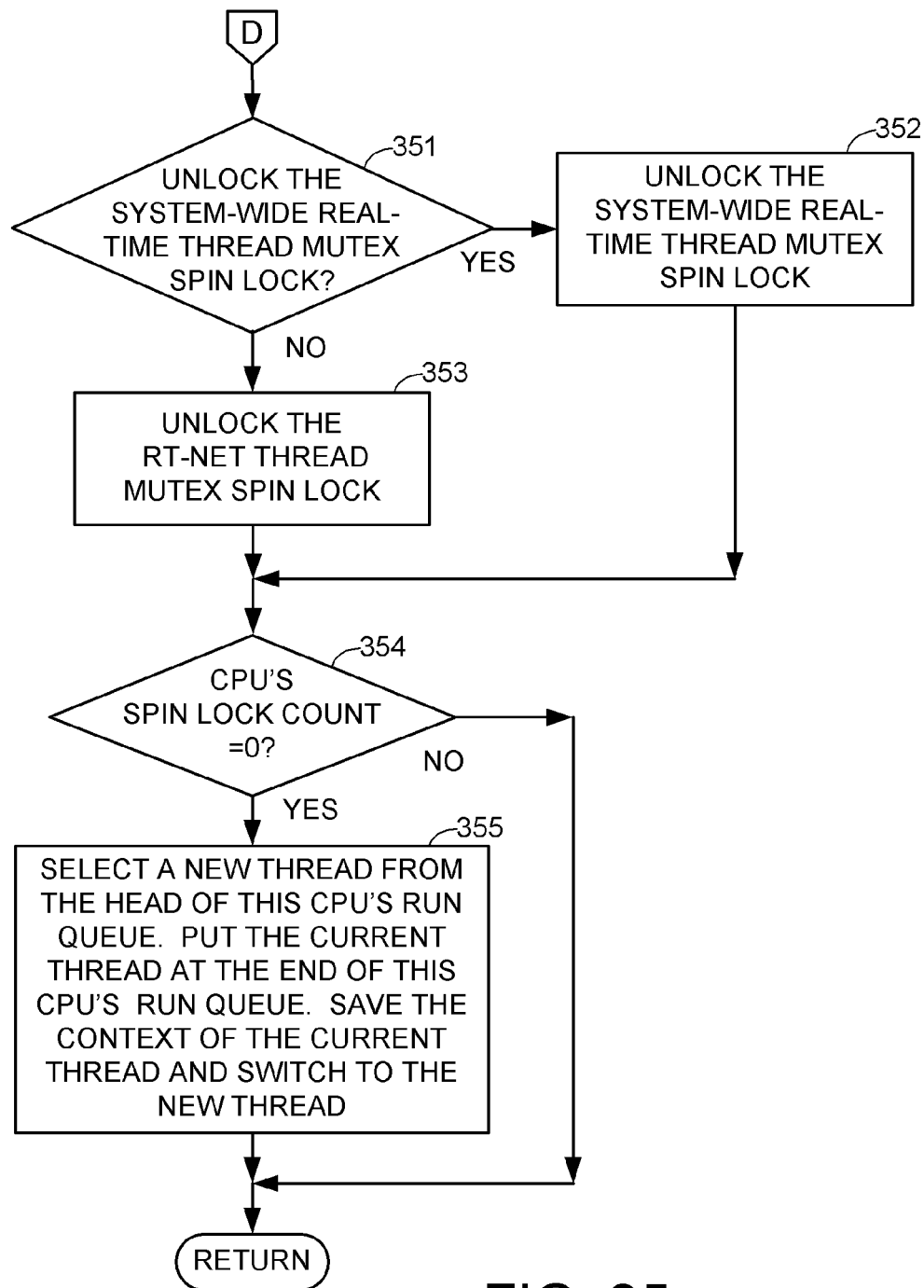

FIGS. 24 and 25 together show an unlock routine called by a general-purpose (GP) thread executing on a CPU to unlock the system-wide real-time thread mutex spin lock or an RT-NET thread mutex spin lock. The unlock routine checks whether control should be transferred to the system-wide real-time thread or to the RT-net thread for this CPU when the lock is released because the lock may have prevented the transfer of control during the last inter-processor interrupt.

The RT-NET thread and system-wide real-time thread locks can be nested. Such a lock is not nested when its spin lock count is zero. The RT-NET thread and system-wide real-time thread locks contain a spin lock that is different from the per-CPU spin lock. The per-CPU spin lock is used to prevent the rescheduling of threads in a specific CPU.

In a first step 341 of FIG. 24, the CPU's spinlock count is decremented and tested. In step 343, if the CPU's spinlock count is equal to zero, then rescheduling of threads may occur on this CPU, so execution branches to step 351 of FIG. 25. Otherwise, if the CPU's spin lock count has not been decremented to zero, execution continues to step 343. In step 343, if the system-side real-time thread mutex spin lock count is equal to one, then execution branches to step 344 to save the context of the current GP thread and switch to the system-wide real-time thread. After step 344, execution returns.

In step 343, if the system-wide real-time thread mutex spin lock count is not equal to one, then execution continues to step 345. In step 345, if the RT-NET thread mutex spin lock count is equal to one, then execution branches to step 346 to save the context of the current GP thread and switch to the RT-NET thread for this CPU. After step 346, execution returns. In step 345, if the RT-NET thread mutex spin lock count is not equal to one, then execution continues to step 351 of FIG. 25.

In step 351 of FIG. 25, if the unlock request is a request to unlock the system-wide real-time thread mutex spin lock, then execution branches to step 352 to unlock the system-wide real-time thread mutex spin lock. For example, in step 352, the system-wide real-time thread mutex spin lock count is decremented. After step 352, execution continues to step 354.

In step 351, if the unlock request is not a request to unlock a system-wide real-time thread mutex spin lock, then the unlock request is a request to unlock an RT-NET thread mutex spin lock. In this case, execution continues from step 351 to step 353 to unlock the RT-NET thread mutex spin lock. For example, in step 353, the RT-NET thread mutex spin lock count is decremented. Execution continues from step 353 to step 354.

In step 354, if this CPU's spin lock count is not equal to zero, then execution returns. Otherwise, if this CPU's spin lock count is equal to zero, then execution continues from step 354 to step 355. In step 355, a new thread is selected from the head of this CPU's run queue. The current thread is put at the end of this CPU's run queue. The context of the current thread is saved, and execution is switched to the current thread. After step 355, execution returns.

Figure 26:
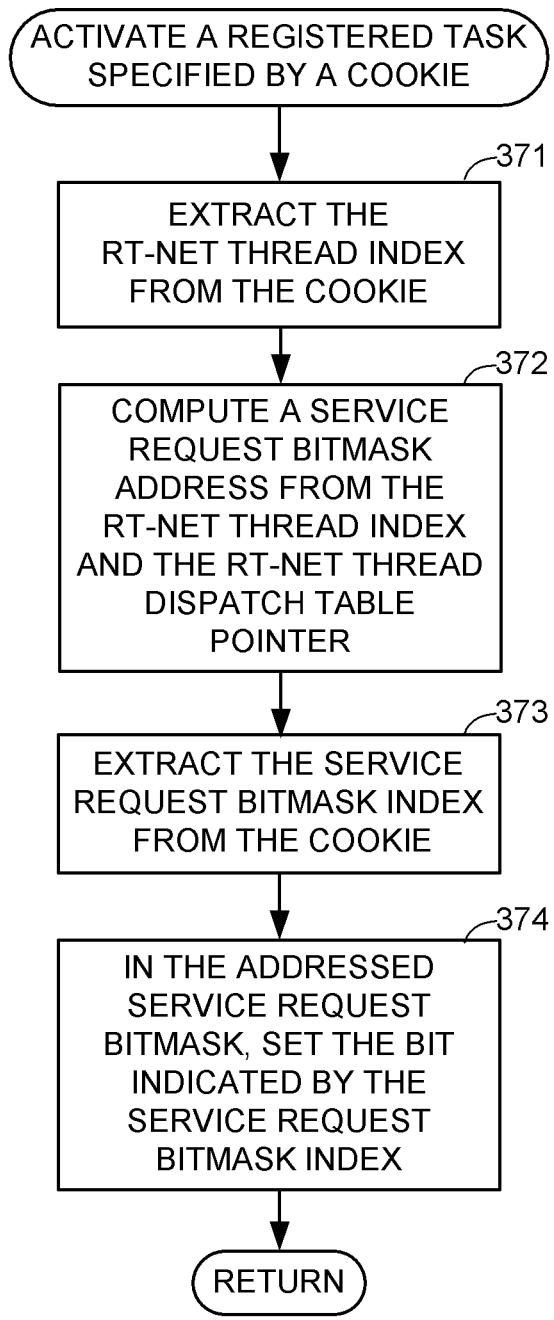
FIG. 26 is a flowchart of a task activation routine.

FIG. 26 shows the task activation routine that was introduced above with reference to step 255 of FIG. 14. The task activation routine is invoked to activate a registered task specified by a cookie. In a first step 371 in FIG. 25, the RT-NET thread index is extracted from the cookie. Next, in step 372, a service request bitmask address is computed from the RT-NET thread index and the RT-NET thread dispatch table pointer. For example, the RT-NET thread dispatch table pointer is the base address of the RT-NET thread dispatch table, and the service request bitmask is located at the very beginning of each RT-NET thread dispatch table entry, so that the service request bitmask address is the sum of the RT-NET thread dispatch table pointer and the product of the RT-NET thread index and a fixed size of each RT-NET thread dispatch table entry.

In step 373, the service request bitmask index is extracted from the cookie. Finally, in step 374, in the addressed service request bitmask, the bit indicated by the service request bitmask index is set. For example, a CPU register is cleared and a carry bit is set in the CPU. Then the contents of the CPU register and the carry are rotated left by a number of bit positions specified by the service request bitmask index. Then a logical OR operation is performed between the register and the addressed service request bitmask, and the result is stored back in the addressed service request bitmask. After step 374, execution returns.

The real-time scheduling as described above with respect to FIGS. 11 to 26 provides processing of an RT-NET thread for a CPU that is different from the processing of a general-purpose thread in a number of ways. The RT-NET thread can only be preempted by interrupt processing. The RT-NET thread cannot be preempted by any general purpose thread. The RT-NET thread can preempt a general purpose thread. The RT-NET thread may contain multiple tasks to be executed, and the RT-NET thread voluntarily gives up control once the activated tasks of the RT-NET thread have been performed.

In a preferred implementation, invocation of the RT-NET thread for a CPU in response to finding that there is at least one activated task for the RT-NET thread is performed at various times during execution of the CPU to ensure that each registered task is executed promptly after activation of the registered task. As described above, the RT-NET thread is invoked in response to finding at least one activated task for the RT-NET thread in step 296 of FIG. 19 during a round-robin inter-processor interrupt of the CPU, in step 324 upon suspension of execution of the system-wide real-time thread, and in step 331 during execution of the idle thread of the CPU.

As described above, a protocol is provided for activating the tasks of a RT-NET thread. First, an application or kernel process invokes the RT-NET task manager to register a task to be executed by a selected CPU when a specific event occurs. The event can be driven by an interrupt, a timer, a queue empty or full condition, or anything else. When such an event occurs, an RT-NET task activation routine activates the registered task by setting a task activation indication for the CPU. A real-time scheduler checks the task activation indications at fixed intervals, and when one is found, execution context is switched to execute the RT-NET thread. A CPU's idle processing also looks for RT-NET task activation indications for the CPU and invokes the RT-NET thread for the CPU upon finding an RT-NET task activation indication for the CPU.

What is claimed is:

1. A method comprising a data processor of a network server executing computer instructions stored on non-transitory computer readable storage medium to perform the steps of:
    (a) an application or kernel process of the network server invoking a real-time network thread manager of the network server to place a real-time task on a real-time task list upon receiving a service request, the real-time network thread manager returning, to the application or kernel process, a cookie identifying the real-time task on the real-time task list, wherein the real-time network thread manager manages a service request table and a real-time thread dispatch table, wherein the service request table includes a set of service request entries for each real-time thread of a set of real-time threads, wherein the real-time thread dispatch table includes an entry for each real-time thread of the set of real-time threads, wherein the real-time task is added to the real-time list by registering the real-time task, wherein the real time task is registered by allocation of an entry for the service request in the service request table, assigning a CPU to the service request, and returning the cookie including an identifier of the assigned CPU, wherein the cookie is used for activating the real-time task, wherein a data processor of the network server includes a plurality of Central Processing Units (CPUs), wherein the plurality of CPUs include at least two CPUs, wherein a CPU of the plurality of CPUs included in the data processor is assigned to the service request, wherein each CPU of the plurality of CPUs is associated with a run queue and a real-time thread for executing real-time tasks assigned to the said CPU, wherein each CPU of the plurality of CPUs is associated with a real-time task list;
    (b) activating the real-time task on the real-time task list when an event occurs during operation of the network server by sending a task activation request including the cookie to a task activation routine, wherein the cookie identifies the real-time thread and CPU assigned to perform the real-time task;
    (c) a real-time scheduler of the network server scanning the real-time task list, and when scanning the real-time task list, the real-time scheduler finding that the real-time task on the real-time task list has been activated, and executing the real-time task on the real-time task list in response to finding that the real-time task on the real-time task list has been activated, wherein the real-time task is executed by a real-time thread associated with a CPU of the plurality of CPUs assigned for executing the real-time task, wherein the real-time thread of each CPU of the plurality of CPUs executes respective real-time task assigned to each CPU concurrently; and
    performing the steps (a), (b), and (c) for each CPU of the plurality of CPUs to schedule and execute real-time tasks associated with each CPU for multi-threaded processing of data transmitted in accordance with a network data transmission protocol.

2. The method as claimed in claim 1, which further includes the application or kernel process of the network server passing the cookie to an interrupt routine, and the interrupt routine sending the task activation request to the task activation routine when servicing an interrupt in response to occurrence of the event during operation of the network server.

3. The method as claimed in claim 1, wherein the step (a) of an application or kernel process of the network server invoking a real-time network thread manager to place a real-time task on a real-time task list includes the application or kernel process sending the service request to the real-time network thread manager, the service request specifying an address of a task service routine, and the real-time network thread manager responding to the service request by placing an entry on the real-time task list, the entry on the real-time task list including the address of the task service routine.

4. The method as claimed in claim 1, wherein the step (a) of an application or kernel process of the network server invoking a real-time network thread manager to place a real-time task on a real-time task list includes the application or kernel process sending the service request to the real-time network thread manager, the service request including at least one service routine argument, and the real-time network thread manager responding to the service request by placing an entry on the real-time task list, the entry on the real-time task list including said at least one service routine argument.

5. The method as claimed in claim 4, wherein the executing of the task in the step (c) includes invoking a call-back to the application or kernel process by using said at least one service routine argument in the entry on the real-time task list to direct the call-back to the application or kernel process.

6. The method as claimed in claim 1, which includes the real-time scheduler performing the scanning of the real-time task list in the step (c) at fixed intervals of time.

7. The method as claimed in claim 1, wherein the step (b) of activating the real-time task on the real-time task list when an event occurs during operation of the network server includes setting a respective bit for the real-time task in a service request bitmask, and wherein the scanning of the real-time task list in the step (c) is performed in response to the real-time scheduler inspecting the service request bitmask to find that there is at least one activated real-time task on the real-time task list.

8. The method as claimed in claim 1, wherein the data processor includes the plurality of CPUs, and the step (c) of the real-time scheduler scanning the real-time task list is performed during execution by one of the CPUs upon finding that there is at least one activated real-time task for said one of the CPUs during execution of an inter-processor interrupt routine of said one of the CPUs, upon suspension of execution of a system-wide real-time thread by said one of the CPUs, and during execution of an idle thread by said one of the CPUs.

9. A network server comprising:
a data processor, wherein the data processor includes a plurality of Central Processing Units (CPUs), wherein the plurality of CPUs include at least two CPUs;
network adapters for linking the data processor to a data network for exchange of data packets between the data processor and clients in the data network; and
non-transitory computer readable storage medium storing computer instructions;
wherein the computer instructions, when executed by the data processor, perform the steps of:
(a) an application or kernel process of the network server invoking a real-time network thread manager of the network server to place a real-time task on a real-time task list upon receiving a service request, the real-time network thread manager returning, to the application or kernel process, a cookie identifying the real-time task on the real-time task list, wherein the real-time network thread manager manages a service request table and a real-time thread dispatch table, wherein the service request table includes a set of service request entries for each real-time thread of a set of real-time threads, wherein the real-time thread dispatch table includes an entry for each real-time thread of the set of real-time threads, wherein the real-time task is added to the real-time list by registering the real-time task, wherein the real time task is registered by allocation of an entry for the service request in the service request table, assigning a CPU to the service request, and returning the cookie including an identifier of the assigned CPU, wherein the cookie is used for activating the real-time task, wherein a CPU of the plurality of CPUs is assigned to the service request, wherein each CPU of the plurality of CPUs is associated with a run queue and a real-time thread for executing real-time tasks assigned to the said CPU, wherein each CPU of the plurality of CPUs is associated with a real-time task list;
(b) activating the real-time task on the real-time task list when an event occurs during operation of the network server by sending a task activation request including the cookie to a task activation routine, wherein the cookie identifies the real-time thread and CPU assigned to perform the real-time task;
(c) a real-time scheduler of the network server scanning the real-time task list, and when scanning the real-time task list, the real-time scheduler finding that the real-time task on the real-time task list has been activated, and executing the real-time task on the real-time task list in response to finding that the real-time task on the real-time task list has been activated, wherein the real-time task is executed by a real-time thread associated with a CPU of the plurality of CPUs assigned for executing the real-time task, wherein the real-time thread of each CPU of the plurality of CPUs executes respective real-time task assigned to each CPU concurrently; and
performing the steps (a), (b), and (c) for each CPU of the plurality of CPUs to schedule and execute real-time tasks associated with each CPU for multi-threaded processing of data transmitted in accordance with a network data transmission protocol.

10. The network server as claimed in claim 9, wherein the computer instructions, when executed by the data processor, further perform the steps of the application or kernel process of the network server passing the cookie to an interrupt routine, and the interrupt routine sending the task activation request to the task activation routine when servicing an interrupt in response to occurrence of the event during operation of the network server.

11. The network server as claimed in claim 9, wherein the step (a) of an application or kernel process of the network server invoking a real-time network thread manager to place a real-time task on a real-time task list includes the application or kernel process sending the service request to the real-time network thread manager, the service request specifying an address of a task service routine, and the real-time network thread manager responding to the service request by placing an entry on the real-time task list, the entry on the real-time task list including the address of the task service routine.

12. The network server as claimed in claim 9, wherein the step (a) of an application or kernel process of the network server invoking a real-time network thread manager to place a real-time task on a real-time task list includes the application or kernel process sending the service request to the real-time network thread manager, the service request including at least one service routine argument, and the real-time network thread manager responding to the service request by placing an entry on the real-time task list, the entry on the real-time task list including said at least one service routine argument.

13. The network server as claimed in claim 12, wherein the executing of the task in the step (c) includes invoking a call-back to the application or kernel process by using said at least one service routine argument in the entry on the real-time task list to direct the call-back to the application or kernel process.

14. The network server as claimed in claim 9, wherein the computer instructions, when executed by the data processor, performs the step (b) of activating the real-time task on the real-time task list when an event occurs during operation of the network server by setting a respective bit for the real-time task in a service request bitmask, and wherein the real-time scheduler, when executed by the data processor, performs the step (c) of scanning of the real-time task list in response to the real-time scheduler inspecting the service request bitmask to find that there is at least one activated real-time task on the real-time task list.

15. The network server as claimed in claim 9, wherein the data processor includes the plurality of CPUs, and the step (c)

of the real-time scheduler scanning the real-time task list is performed during execution by one of the CPUs upon finding that there is at least one activated real-time task for said one of the CPUs during execution of an inter-processor interrupt routine of said one of the CPUs, upon suspension of execution of a system-wide real-time thread by said one of the CPUs, and during execution of an idle thread by said one of the CPUs.

16. The network server as claimed in claim 9, wherein the computer instructions include multiple real-time kernel threads executed in different ones of the CPUs simultaneously to perform the real-time tasks, each of the real-time kernel threads perform multiple tasks, each of the real-time kernel threads are only pre-empted by interrupt processing, and each of the real-time kernel threads pre-empt general purpose threads.

* * * * *